(12) United States Patent
Mann

(10) Patent No.: US 11,490,637 B2
(45) Date of Patent: Nov. 8, 2022

(54) FLAVOUR SELECTABLE FROZEN SOFT-SERVE CONFECTION DISPENSING MACHINE

(71) Applicant: Sunveer Mann, Ancaster (CA)

(72) Inventor: Sunveer Mann, Ancaster (CA)

(*) Notice: Subject to any disclaimer, the term of this patent is extended or adjusted under 35 U.S.C. 154(b) by 292 days.

(21) Appl. No.: 16/924,764

(22) Filed: Jul. 9, 2020

(65) Prior Publication Data
US 2020/0337333 A1    Oct. 29, 2020

Related U.S. Application Data

(63) Continuation of application No. PCT/CA2018/050593, filed on May 18, 2018.

(51) Int. Cl.
*A23G 9/28* (2006.01)
*G07F 13/06* (2006.01)
(Continued)

(52) U.S. Cl.
CPC .......... *A23G 9/282* (2013.01); *A23G 9/283* (2013.01); *G07F 13/06* (2013.01); *G07F 13/10* (2013.01); *G07F 17/0071* (2013.01)

(58) Field of Classification Search
CPC ....... B05C 17/00553; A61C 5/64; A23G 9/28; A23G 9/282; A23G 9/283; G07F 13/06; G07F 13/10; G07F 17/0071
(Continued)

(56) References Cited

U.S. PATENT DOCUMENTS 3,608,325 A    9/1971    Hock et al.
3,626,709 A    12/1971   Yuza et al.
(Continued)

FOREIGN PATENT DOCUMENTS

EP    1450318 A2    8/2004
EP    1588981 A1    10/2005
(Continued)

OTHER PUBLICATIONS

International Search Report for PCT/CA2018/050593, dated Feb. 12, 2019.

*Primary Examiner* — Vishal Pancholi
*Assistant Examiner* — Robert K Nichols, II
(74) *Attorney, Agent, or Firm* — Daniel J. Honz; Advent, LLP

(57) ABSTRACT

The present invention relates to a frozen soft-serve confection dispensing machine where the soft serve confection is a flavored frozen soft-serve confection having a base selected from ice creams, frozen yogurts, sorbets and gelatos. The dispensing machine comprises one or more base hoppers, each base hopper being linked to a dedicated detachable base cartridge, a dedicated plurality of detachable flavour cartridges containing a flavour mix and a dedicated mixing chamber and storage slot associated with each detachable flavour cartridge. The detachable base cartridge and plurality of flavour cartridges are connected to one of the base hoppers. Control means are provided to enable a user to select a flavour mix from one of the dedicated flavour cartridges, and to cause the base and selected flavour mix to be mixed in the dedicated mixing chamber and then storing and refrigerating the mixture of the base and flavour mix in the storage slots to form a mixed frozen soft-serve confection for dispensing.

10 Claims, 10 Drawing Sheets

(51) Int. Cl.
*G07F 13/10* (2006.01)
*G07F 17/00* (2006.01)

(58) Field of Classification Search
USPC .................................. 222/129, 145.5, 145.6
See application file for complete search history.

(56) References Cited

U.S. PATENT DOCUMENTS

| | | |
|---|---|---|
| 3,876,110 A | 4/1975 | Logie |
| 6,637,214 B1 | 10/2003 | Leitzke et al. |
| 7,059,761 B2 * | 6/2006 | Gerber ................ B01F 35/2206 |
| | | 366/322 |
| 7,648,050 B1 | 1/2010 | Ehlers |
| 2002/0108964 A1 * | 8/2002 | Staten .................... A23G 9/163 |
| | | 222/61 |
| 2009/0007984 A1 | 1/2009 | Nuriely |
| 2010/0062128 A1 * | 3/2010 | Khoo ...................... A23F 5/465 |
| | | 426/474 |
| 2014/0157698 A1 | 6/2014 | Cihak et al. |
| 2016/0242434 A1 | 8/2016 | Jones et al. |
| 2017/0071228 A1 | 3/2017 | Ferraz Cury |
| 2017/0099855 A1 * | 4/2017 | Cocchi ................... A47J 31/34 |
| 2017/0143000 A1 | 5/2017 | Bruckner et al. |
| 2017/0362071 A1 | 12/2017 | Showalter |

FOREIGN PATENT DOCUMENTS

| | | |
|---|---|---|
| EP | 3017702 A1 | 5/2016 |
| WO | 2005080199 A1 | 9/2005 |
| WO | 2006007430 A2 | 1/2006 |

\* cited by examiner

FLAVOUR SELECTABLE FROZEN SOFT-SERVE CONFECTION DISPENSING MACHINE

FIELD OF THE INVENTION

This invention generally relates to apparatus and method of flavour selection and dispensing flavored frozen soft-serve confection products such as ice creams, frozen yogurts, sorbets and gelatos.

DESCRIPTION OF THE PRIOR ART

While soft serve confection dispensing machine are known there are a number of problems with the known machines:
(1) Re-filling of the base hopper with ice creams, frozen yogurts, sorbets and gelatos is difficult and often messy
(2) the known machines do not make select from a plurality of flavours easy
(3) Better mixing of the base material and the flavor mix is required
(4) Refrigeration can be energy inefficient
(5) Access to control system, if any, is difficult

SUMMARY OF THE INVENTION

The present invention provides apparatus for flavour selection and then dispensing flavored frozen soft-serve confections from a dispensing machine that overcomes some, and with the preferred embodiment all, of the above problems associated with known machines. A frozen soft-serve confection dispensing machine where the soft serve confection is a flavored frozen soft-serve confection has a base selected from ice creams, frozen yogurts, sorbets and gelatos. The dispensing machine according to one embodiment comprises one or more base hoppers, each base hopper being linked to a dedicated detachable base cartridge. A dedicated plurality of detachable flavour cartridges containing a flavour mix and a dedicated mixing chamber and storage slot associated with each detachable flavour cartridge are provided with the detachable base cartridge and plurality of flavour cartridges being connected to one of the base hoppers. The dispensing machine has control means to enable a user to select a flavour mix from one of the dedicated flavour cartridges, and to cause the base and selected flavour mix to be mixed in the dedicated mixing chamber and then storing and refrigerating the mixture of the base and flavour mix in dedicated storage slots to form a flavoured frozen soft-serve confection for dispensing.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

Similar references are used in different figures to denote similar components

DETAILED DESCRIPTION OF THE PREFERRED EMBODIMENT

This invention relates to apparatus and method of flavour selection and dispensing flavored frozen soft-serve confection products such as ice creams, frozen yogurts, sorbets and gelatos.

Figure 1:
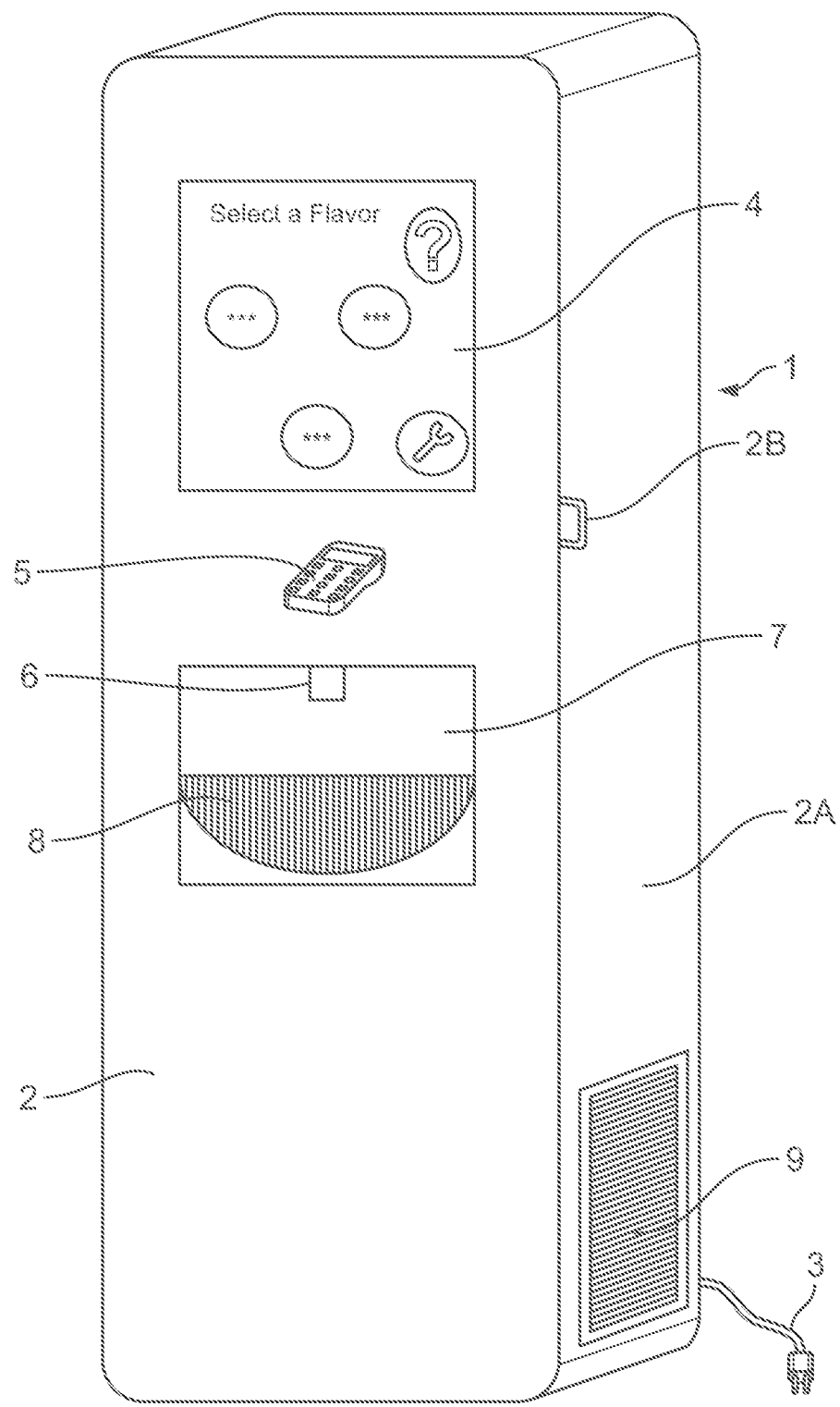
FIG. 1 is a schematic perspective view of one embodiment of a frozen soft-serve confection dispensing machine according to the present invention.
Figure 2:
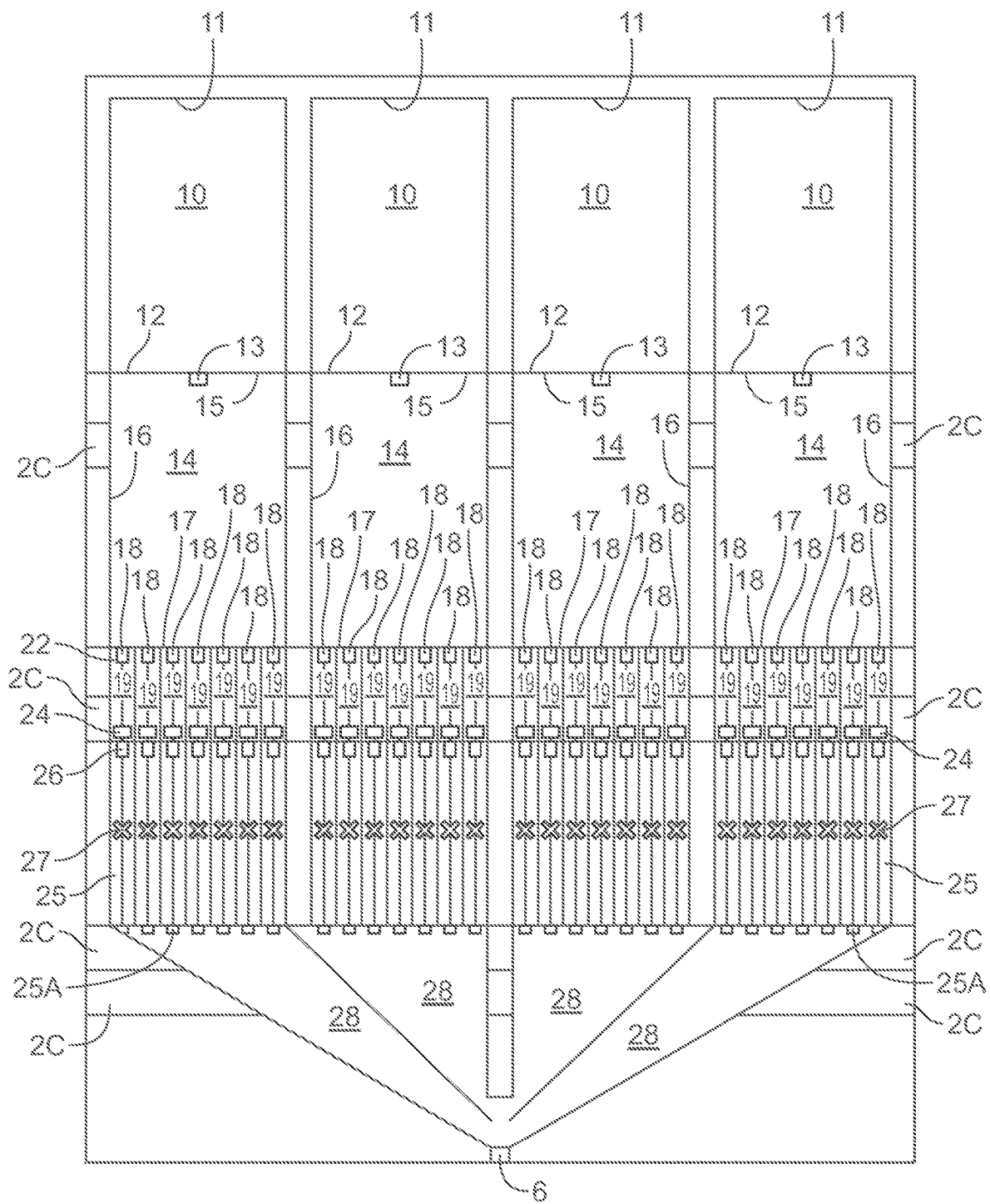
FIG. 2 is a schematic front plan view of the interior of the frozen soft-serve confection dispensing machine of FIG. 1.
Figure 3:
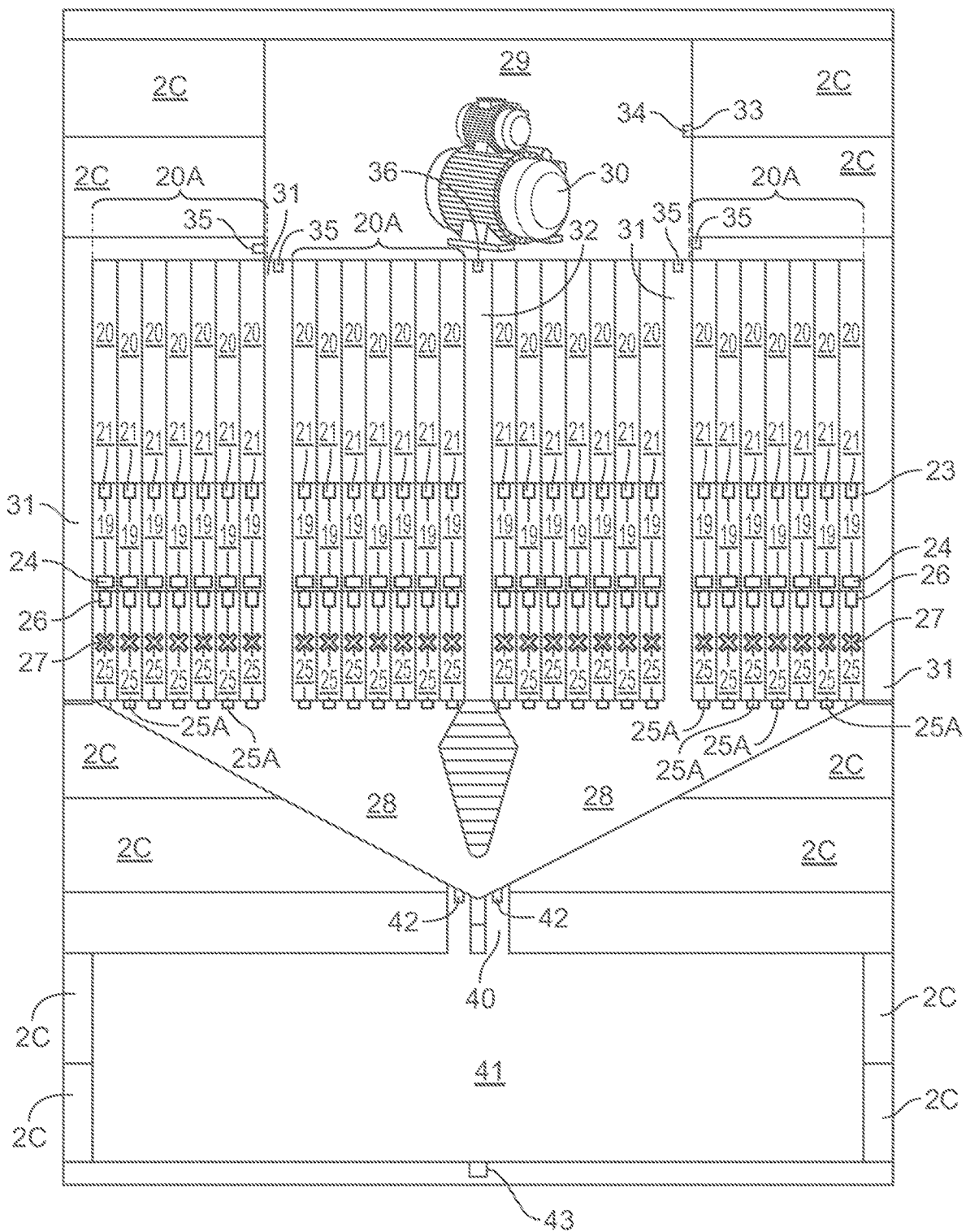
FIG. 3 is a schematic back plan view of the interior of the frozen soft-serve confection dispensing machine of FIGS. 1 and 2.
Figure 4:
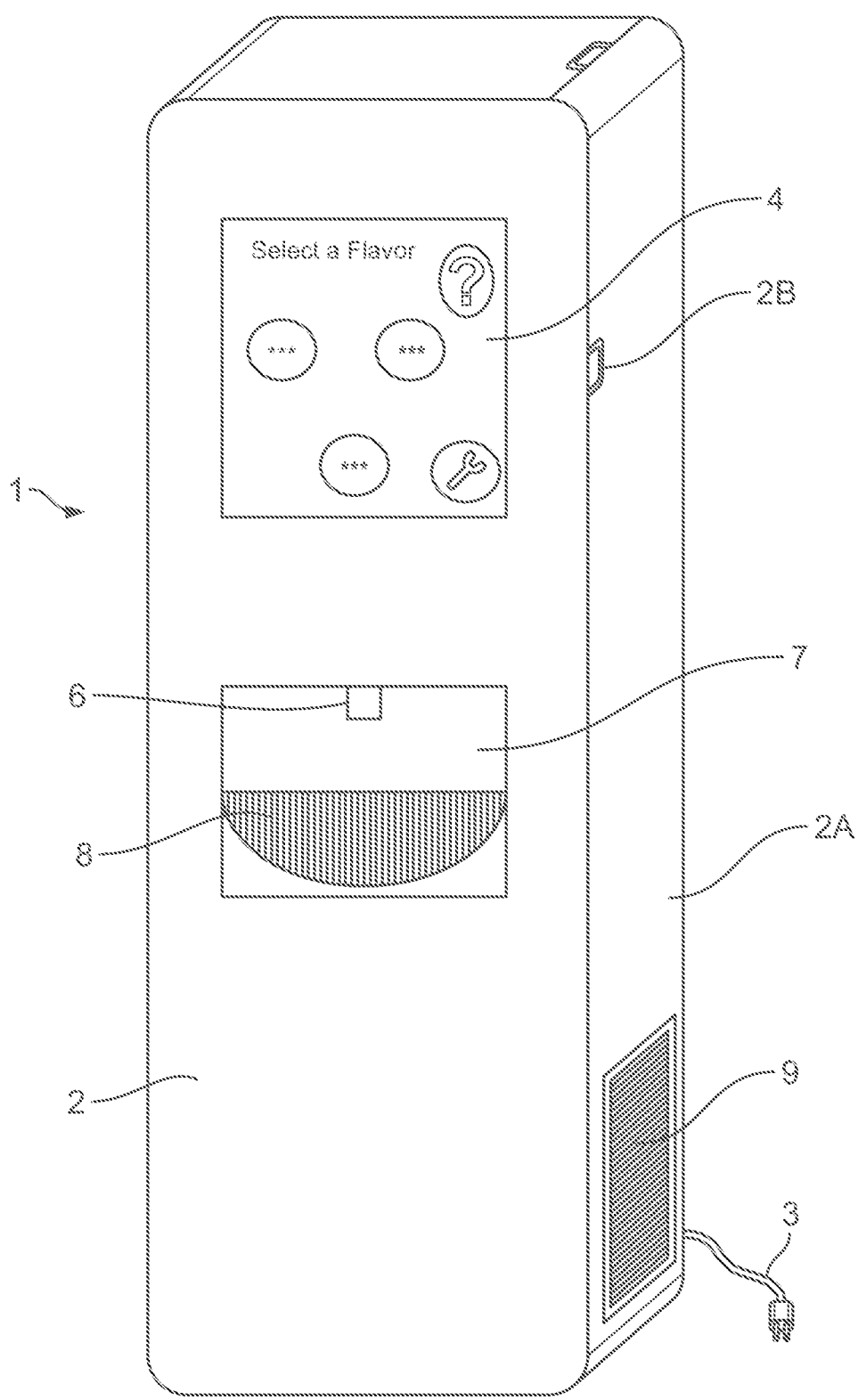
FIG. 4 is a schematic perspective view of another embodiment of a frozen soft-serve confection dispensing machine according to the present invention.
Figure 5:
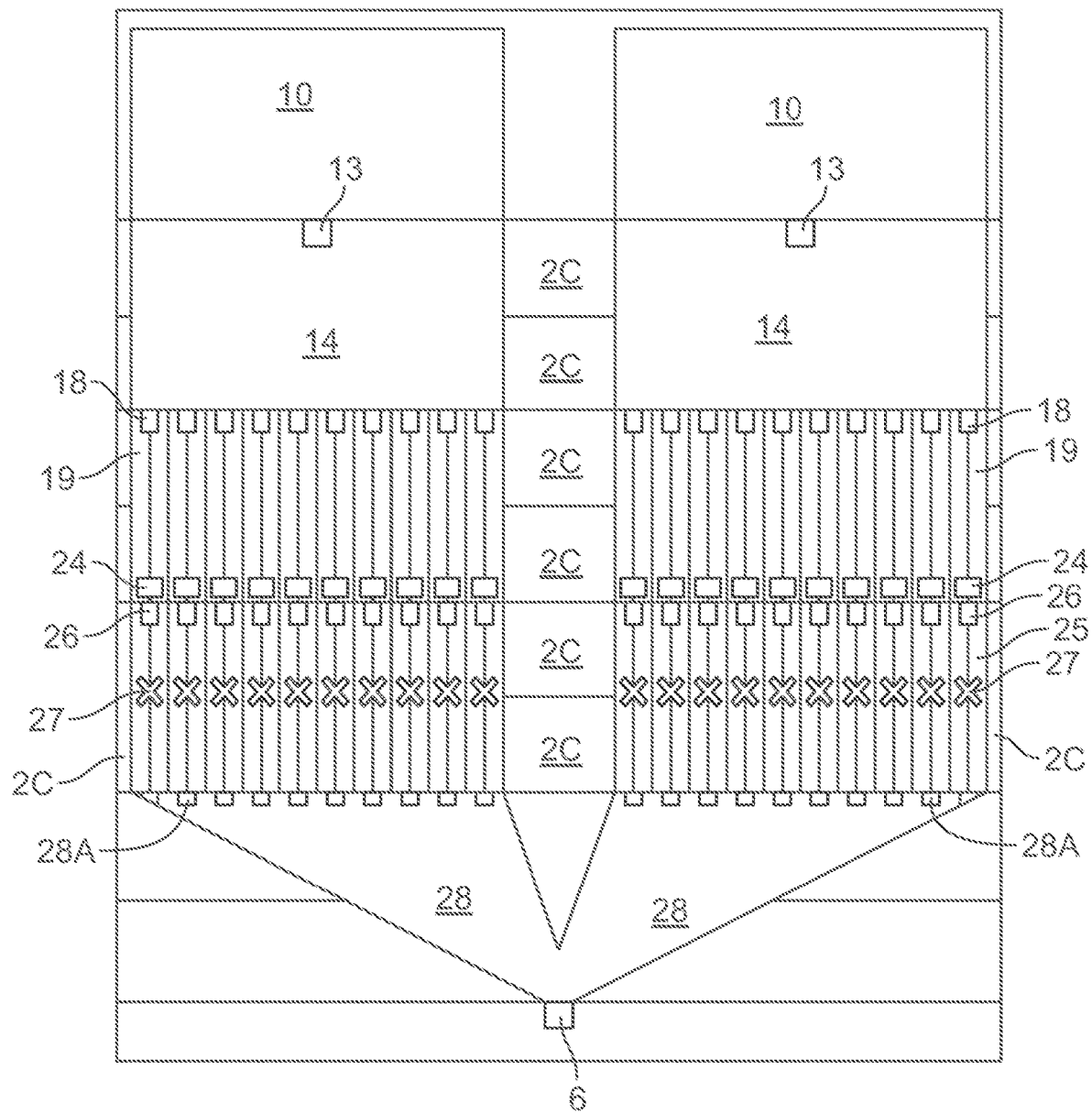
FIG. 5 is a schematic front plan view of the interior of the frozen soft-serve confection dispensing machine of FIG. 4.
Figure 6:
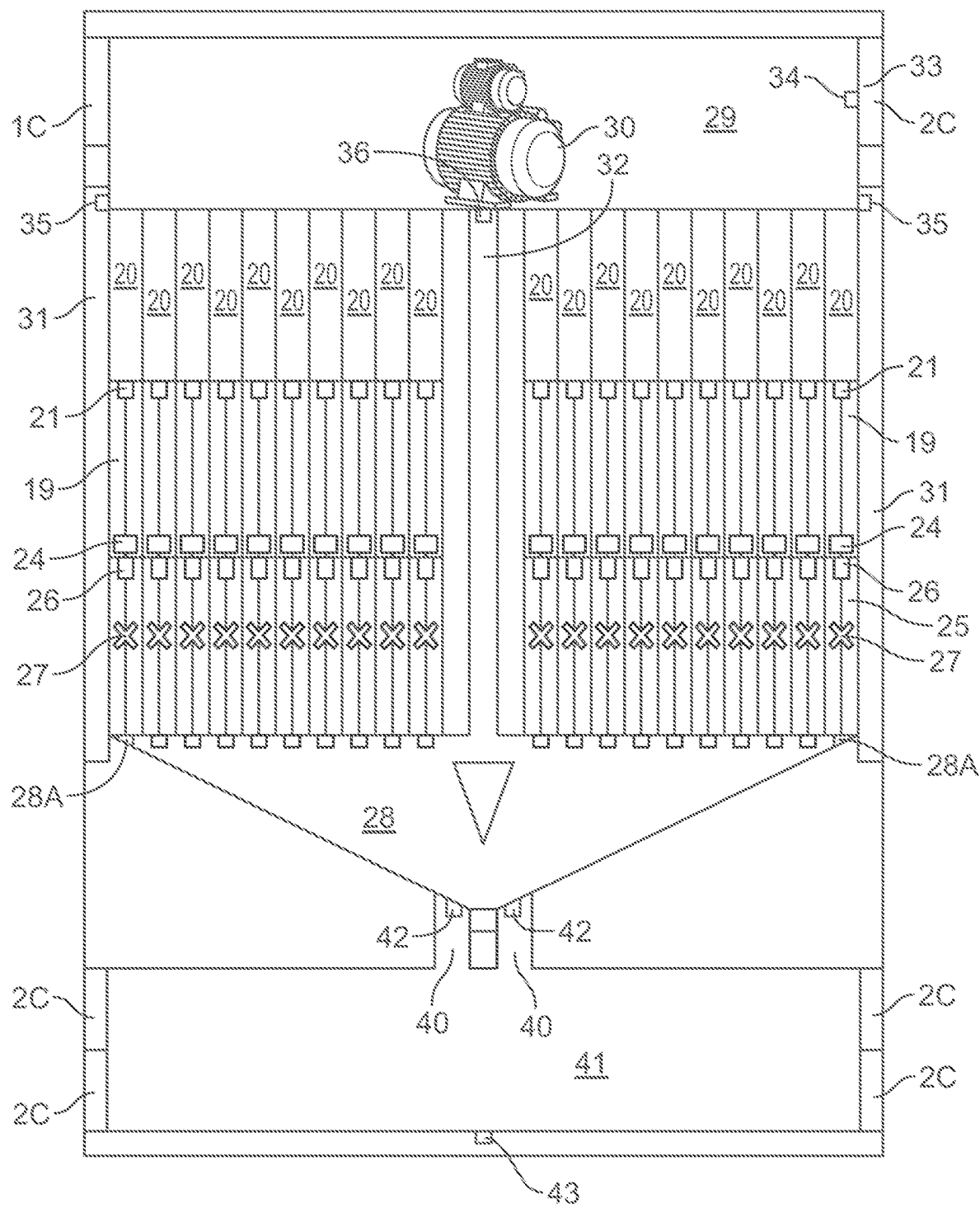
FIG. 6 is a schematic back plan view of the interior of the frozen soft-serve confection dispensing machine of FIGS. 4 and 5.
Figure 7:
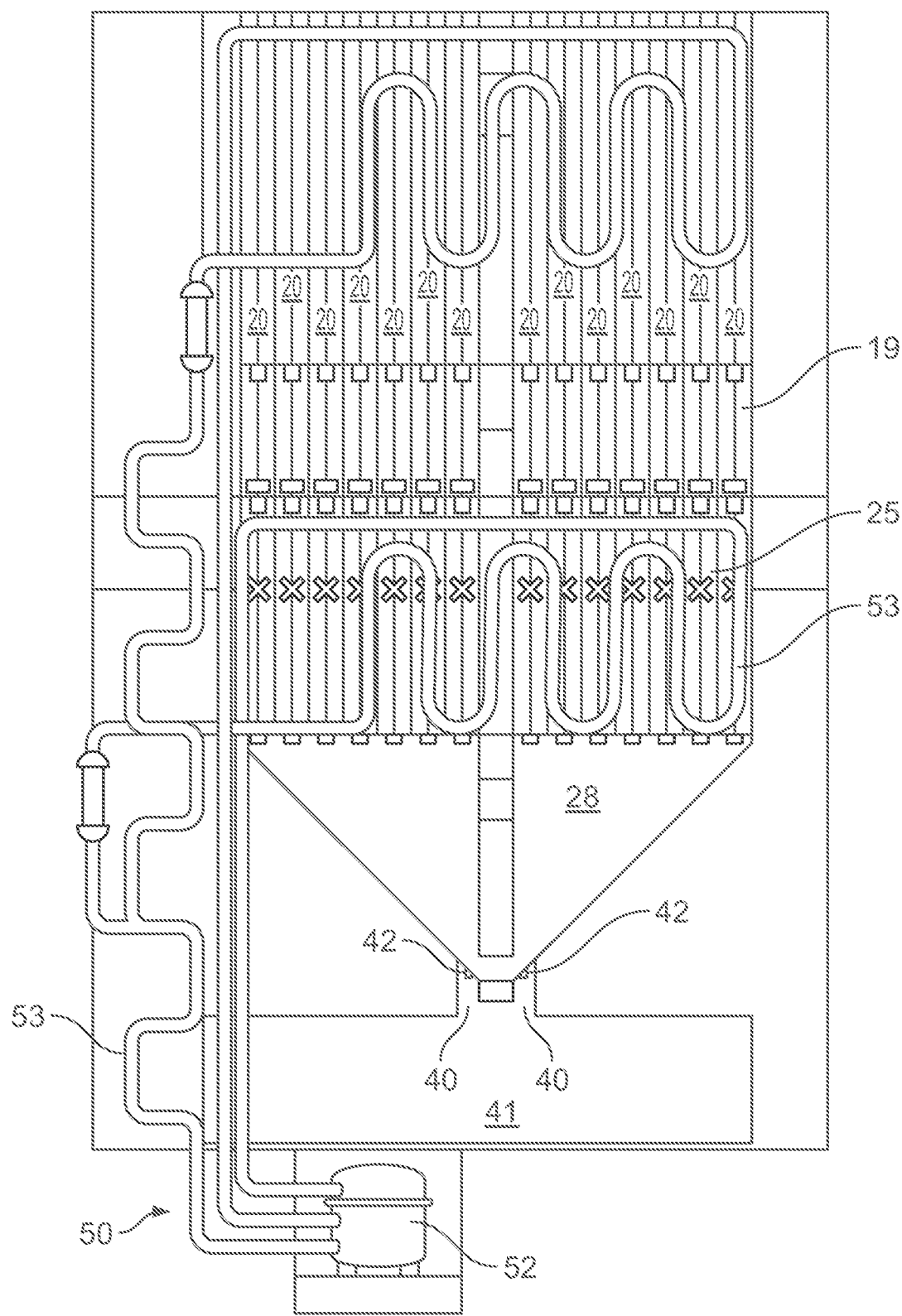
FIG. 7 is a partial schematic back plan view of the interior of the frozen soft-serve confection dispensing machine of FIGS. 4 and 5 showing the refrigeration system.

Referring to FIGS. 1, 2 and 3 one embodiment of a frozen soft-serve confection dispensing machine according to the present invention is illustrated. The frozen soft-serve confection dispensing machine illustrated in FIG. 1, generally indicated at 1, has an outer housing 2 and is connected to an electrical power source by power cord 3. A Touch-Screen Interface 4 is located on the front of the outer housing 2 and has a programmable microprocessor associated with it so that by using the Touch-Screen Interface 4, a customer can control the flavour selection and dispensing of the desired flavoured confections.

Also as shown in FIG. 1, located on the front of the outer housing 2 is a POS terminal 5. The POS terminal 5 is intended to be used to accept credit/debit card payments for the exchange of a specified amount of flavored ice-cream(s), flavored frozen yogurt(s), flavored sorbet(s), and/or flavored gelato(s), produced by the machine 1. The amounts, and payments per amounts of flavored ice-cream(s), flavored frozen yogurt(s), flavored sorbet(s), and/or flavored gelato(s) can be adjusted and set through the Touch-Screen Interface 4.

The soft-serve confection is dispensed through a valve 6 located at the top portion of a stainless steel back splash 7 located on the front of the outer housing 2. A drip tray 8 is located at the bottom of the back splash 7. The drip tray 8 is preferably stainless-steel a sits upon the backsplash 7 of the machine, and it has a primary purpose of swallowing any excess soft-serve that may be spilled upon the tray's surface. An option would be to have the excess soft-serve drip straight down to a dirty water hopper described later in this disclosure.

A door 2A is typically provided in either the left, right or back side of the outer housing 2 to provide access to the interior of the dispensing machine 1. In the embodiment illustrated in FIG. 1., door 2A is shown on the right side of the outer housing with an air vent 9 to vent warm air from the lower section of the interior of the machine. A metal handle 2B used to open the door 2A, whether it be the front door, back door, or left-side door. The handle 2B can be installed with a key required lock, for extra security.

Within the housing 2, as shown in FIGS. 1 and 2, is a plurality of detachable base cartridges 10. In FIG. 2 four detachable base cartridges 10 are illustrated. Each of the detachable base cartridges 10 is made from a food appropriate material such as plastic. The detachable base cartridges 10 have an outer top wall 11, bottom wall 12 and side walls defining an interior cavity. The outer top wall 11 has a lid that can be opened and closed to enable a frozen confection base such as ice cream, frozen yogurt, gelato or sorbet to be loaded into one of the detachable base cartridges 10. A dispensing valve 13 is located on the bottom wall 12 of the detachable base cartridges 10 to permit the confection base to be emptied out of the base cartridge 10. Dispensing valve 13 is preferably made from stainless steel and is controlled to open and close on command. In the embodiment illustrated the outlet from the dispensing valve 13 is about 2 millimeters in diameter.

Each of the detachable base cartridges 10 is sized and adapted to be placed in the dispensing machine 1 above a corresponding base hopper 14. In the embodiment illustrated in FIG. 2 there are four base hoppers 14 one for each of the base cartridges 10.

A steel frame 2C within the outer housing 2 of the dispensing machine 1 supports the detachable base cartridges 10, base hoppers 4 and other components of the dispensing machine 1. The base hoppers 14 hold the confection base dispensed from the detachable base cartridges 10. Each base hopper 14 has a top wall 15, side walls 16 and bottom wall 17 and a plurality of outlet valves 18 located along the bottom wall 17. The top wall 15 is provided with a lid to permit access to the interior of the hopper. Access is also provided through the top wall 15 for the dispensing valve 13 on the bottom of each of the base dispensing cartridges 10.

The base hopper's main function is to hold an ice cream base, frozen yogurt base, gelato base, or sorbet base, until the base is dispensed through the outlet valves 18 into one of a plurality of mixing chambers 19.

The lid of each base hopper 14 can be opened up by unscrewing it and manually taking it off to enable access to the interior of the hopper 14.

As best illustrated in FIG. 3, a plurality 20A of flavour cartridges 20 are associated with each base hopper 14 and mixing chamber 19. The flavor cartridges 20 carry concentrated flavor or flavored mix, to mix with the soft serve bases in mixing chambers 19 as described herein, ultimately to make a final soft serve flavor e.g. vanilla ice cream, strawberry frozen yogurt, raspberry sorbet, and/or banana gelato. The bottom of the flavor cartridge 20 can attach or detach from the top of one of the mixing chambers 19. The contents from the flavour cartridges 20 are dispensed into the top-back of the mixing chamber 19 it is attached to. Control of the flavour selection and dispensing through the controlled valve 21 in the bottom of each flavour cartridge is through the Touch-Screen Interface 4. When one flavour cartridge 20 is empty, it is detached manually from the mixing chamber 19 it's attached to and replaced or filled up by opening up the top of the cartridge. The number of flavour cartridges 20 can vary for each machine, some might have 7, 8, 9, or even 10 for each base hopper 14 in their machine. The controlled valve 21 exiting the flavour cartridges 20 has a smaller diameter than the outlet valves 18 from the base hopper 14. In the preferred embodiment the diameter of the controlled valves 21 is about a millilitre.

In some embodiments the flavour cartridge 20 has a plastic exterior wall and a stainless steel interior wall, with a built-in electric press machine like punch. This type of cartridge is used for thicker flavour liquids, or even non-liquid flavour mixes e.g. caramel, cookie bits, etc. The punch is electrically wired and will press the cartridge's contents down towards the controlled valve 21 in the bottom of the flavour cartridge, in order to help dispense the cartridge's contents into the mixing chamber. The punch moves back up, when the controlled valve 21 in the bottom of each flavour cartridge closes.

Each mixing chamber 19 has two portions that are divided at the top; the front 22 and the back 23. The base hopper 14 is connected to the top front 22 of each set of mixing chambers 19, and a single flavour cartridge 20 can be attached to the top back 23 of a mixing chamber 19. The flavour cartridge 20 can be detached as noted earlier. The base is dispensed into each mixing chamber 19 from the connected base hopper 14 through an outlet valve 18 located on the top front 22 of the mixing chamber 19. A concentrated flavour mix or flavoured mix, from a single flavour cartridge 20 attached to the top back 23 of the specified mixing chamber 19 can enter through the controlled valve 21 located at the top back 23 of the mixing chamber 19. Once a concentrated flavour mix or flavoured mix is dispensed into their designated mixing chamber 19, and the base is dispensed into the same mixing chamber 19, (base goes into every slot, flavors go into their individual slots) the liquid base and concentrated flavour mix or flavoured mix are blended into one soft serve. The mixing chamber 19 is typically made from stainless and has a stainless steel blending unit 24 inside the mixing chamber 19 and which is electrically powered and controlled through the Touch-Screen Interface 4. To adjust how much base is dispensed into a mixing chamber 19 at a single mixing process, the user would have to access the Touch-Screen Interface via. a Settings menu.

Once the base and concentrated flavour mix or flavoured mix are blended into one soft serve, the soft serve is dispensed from the mixing chamber 19 through a controlled outlet valve 26 into a storage slot 25 directly under the mixing chamber 19. The storage slot 25 stores the flavored ice cream, flavored frozen yogurt, flavored gelato, or flavored sorbet (mixed base & concentrated flavor mix or flavored mix combination). Each storage slot 25 under each mixing chamber 19 is preferably made from stainless steel and the amount of the flavored ice cream, flavored frozen yogurt, flavored gelato, or flavored sorbet in the slot can be determined by a control and viewed on the Touch-Screen Interface 4 via. the Settings menu. The storage slot 25 is refrigerated to a temperature of about −17 degrees Celsius and holds the mixed soft serve until it hardens into flavored ice cream, flavored frozen yogurt, flavored gelato, or flavored sorbet.

Each storage slot 25 has a churner unit 27 along the center portion of the slot's interior. The churner 27, which is electrically powered, churns the soft serve contents in the storage slot 25 for 15 seconds every 15 minutes, and every time a flavor of soft serve is selected to be dispensed by the Touch-Screen Interface 4.

The consumer's selected soft serve is dispensed from the appropriate storage slot 25 through a controlled outlet valve 25A into final pipe 28 until it is dispensed through the valve 6. All of the final pipes 28 connect at the bottom in order for them to dispense through one final valve 6.

A stainless steel high-pressure water hopper 29 holds water that is ejected, under pressure by a high-pressure water pump 30, through a high-pressure water hose(s) 31 and/or the high-pressure water pipe(s) 32, to clean different parts of the machine. The top of the water hopper 29 can be opened to fill the hopper 29 up with water, or a water hose or water pipe can be attached to a hose connection 33. The amount of clean water in the hopper 29 is monitored by the control system and displayed on the Touch-Screen Interface via. Settings—Water Levels—High-Pressure Water Level. When the water level is low, the hopper 29 can be manually filled up with water, or if the hopper 29 is connected to a water pipe, it will be filled up automatically, as the Touch-Screen Interface can be used to cause the hose connection intake 34 to open, when the water level in the hopper 29 is at 15%. It will be filled up to a level of 100% and then the hose connection intake 34 will be closed again. Or if a hose is connected to the hose connecter 33, the user can manually turn ON the hose and let the water into the hopper 29 until, the hopper is 100% full.

In the embodiment illustrated in FIG. 3, the hose connection 33 is located on the top right exterior of the water hopper 29. It enables a water hose or water pipe to attach on to the outside of the water hopper 29, and it has an inlet/outlet valve 34 attached to the corresponding top right interior of the water hopper 29, which allows water to flow from a water hose or water pipe into the hopper when commanded to, by the Touch-Screen Interface.

The flexible high pressure water hose 31 is illustrated in FIG. 3. The hose releases high-pressure water from the water hopper 29 through a water outlet valve 35 once it is ordered to do so by the Touch-Screen Interface via. Settings—Base or Flavor Level—Selected Base or Flavor Level—Wash Button. The water from this hose 31 cleans/drains the base in a base hopper 14, or the flavored ice cream, flavored frozen yogurt, flavored gelato, or flavored sorbet in a flavour slot 25 and the mixing chamber 19 the flavour slot 25 is attached to. This hose 31 is only used for the washing process. This hose 31 needs to be connected to a base hopper 14 or to the top of a mixing chamber 19 before a wash button can be pressed, and the washing process can start. Multiple base hoppers 14 and/or storage slots 25/mixing chambers 19 can be washed simultaneously, depending on the number of high-pressure water hoses 31, available in the machine.

A stainless steel high pressure water pipe 32, shown in FIG. 3, is utilized to release high-pressure water from the water hopper 29 through a controlled water outlet valve 36. The water released through this pipe 32 is used to clean the excess flavored ice cream, flavored frozen yogurt, flavored gelato, and/or flavored sorbet left in a final pipe(s) 28 after a soft serve is done being dispensed. This pipe 32 is only used for the cleaning process of the final pipe(s) 28, and has an inlet connected to the water hopper 29, and its outlet connected to the final pipe(s) 28. If the cleaning process time after a specific soft serve flavour/or all soft serve flavours have been dispensed needs to be changed, a user could achieve that by adjusting the programed time by way of the Touch-Screen Interface via. Settings—Cleaning Process—Selected Flavor. The number of high-pressure water pipes 38 varies for each machine as it depends on the number of base hoppers 14 in the machine. If there are multiple base hoppers 14 and high-pressure water pipes 32, when the cleaning process is initiated, high-pressure water will burst through all of the high-pressure water pipes 32.

A stainless steel dirty water pipe 40 is connected to the bottom of where the final pipe(s) 28 connect, and to the top of a dirty water hopper 41. After the final pipe(s) 28 are washed during the Cleaning Process or the Washing Process, valves 42 connected to the top of the dirty water pipes 40 will be opened, letting the dirty water contents from the processes drain into the pipes 40, and ultimately into the dirty water hopper 41. There are two dirty water pipes 40 in every machine, and after the Cleaning or Washing Processes are finished, both of their valves 42 will be opened, and closed once all the dirty water contents in the machine are in the dirty water hopper 41.

The stainless steel dirty water hopper 41 stores all the excess dirty water flushed into it by the dirty water pipes 40. The amount of dirty water in the hopper 41 can be monitored by the control system and displayed on the Touch-Screen Interface via. Settings—Water Levels—Dirty Water Levels. At the bottom of the hopper 41, is a valve 43 which, can be used to empty out the dirty water hopper's 41 contents, when directed to by the Touch-Screen Interface via. Settings—Water Levels—Dirty Water Levels—Wash Button.

A second embodiment shown in FIGS. 4, 5, 6 and 7 is similar to the embodiment shown in FIGS. 1-3, but has two base hoppers 14 and two base cartridges 20. Other than that the arrangement of parts is similar and functions in the same way.

Figure 8:
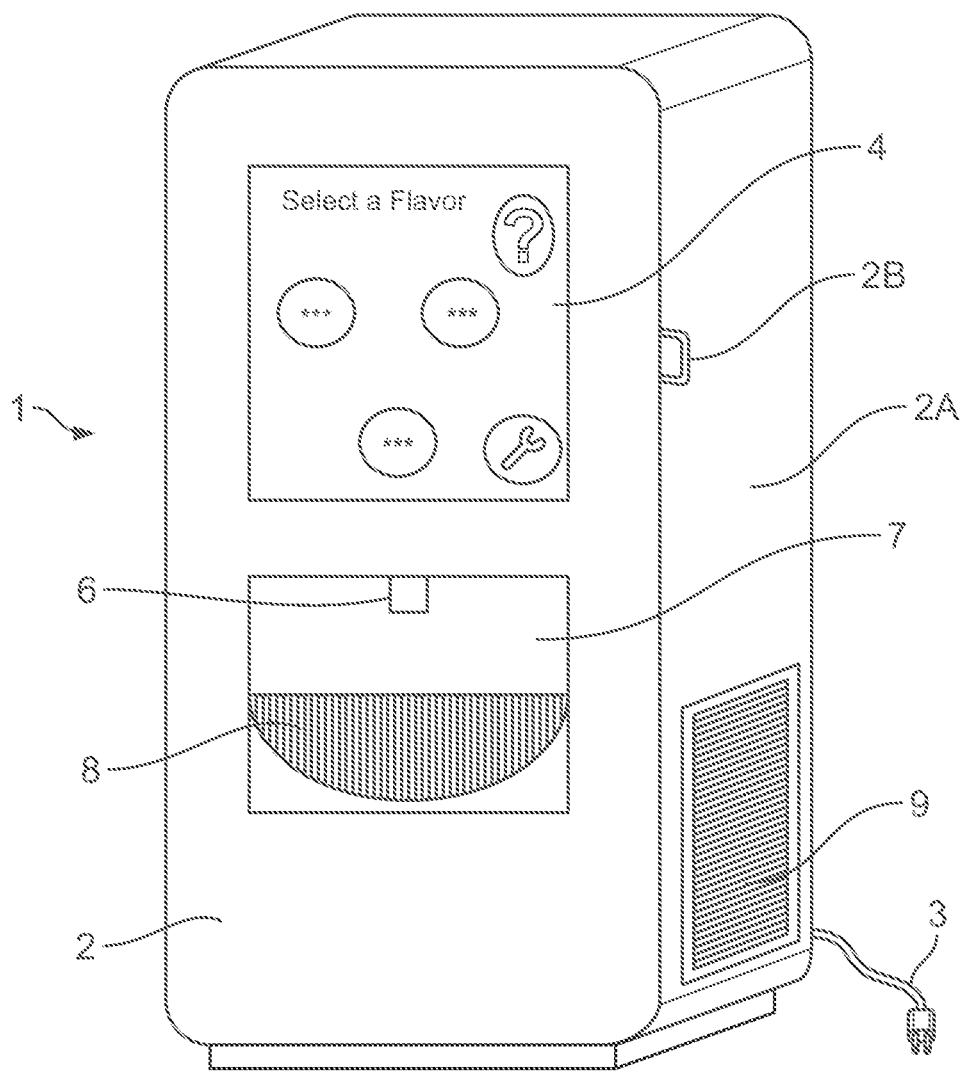
FIG. 8 is a schematic perspective view of another embodiment of a frozen soft-serve confection dispensing machine according to the present invention.
Figure 9:
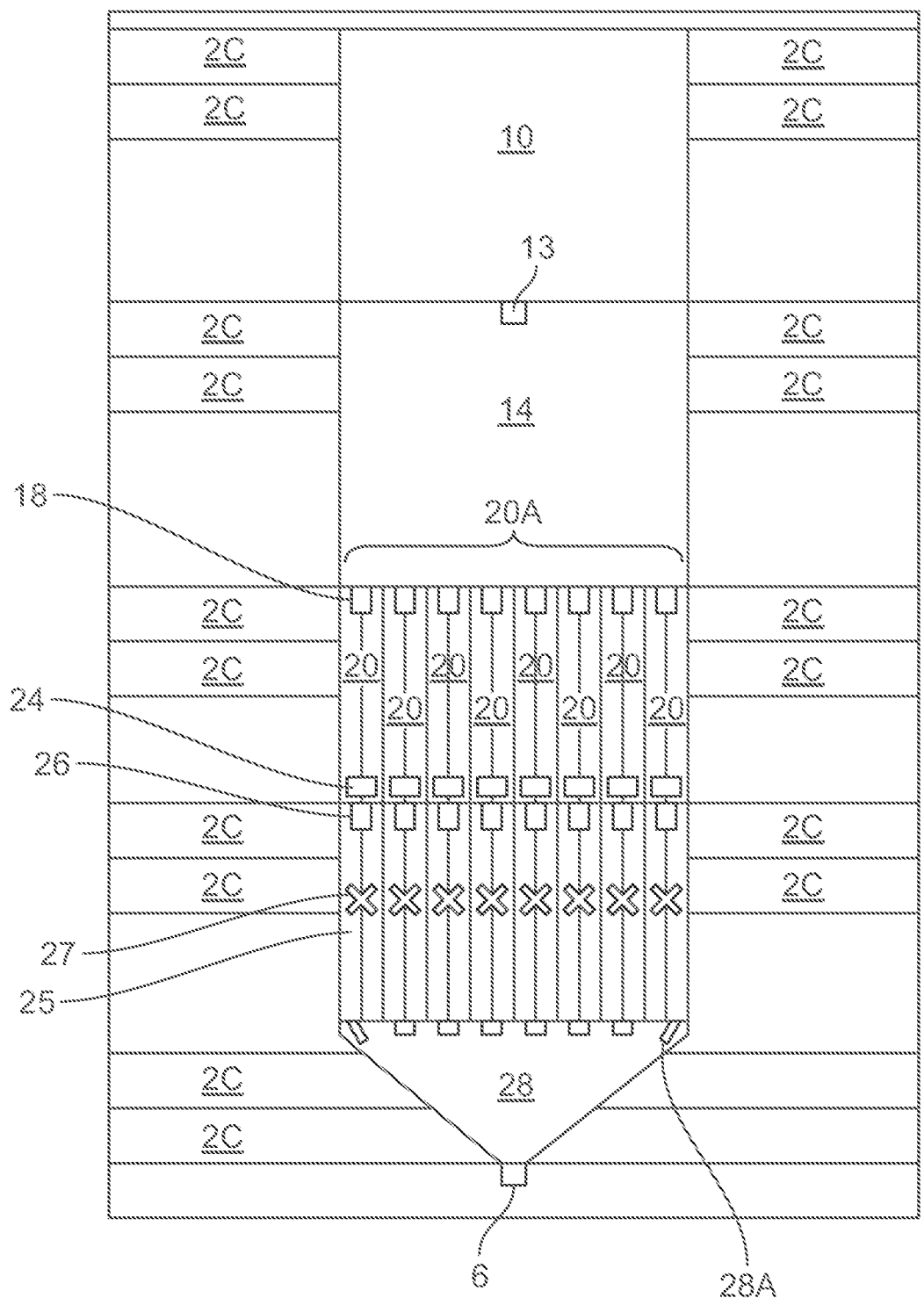
FIG. 9 is a schematic front plan view of the interior of another embodiment of a frozen soft-serve confection dispensing machine of FIG. 8.
Figure 10:
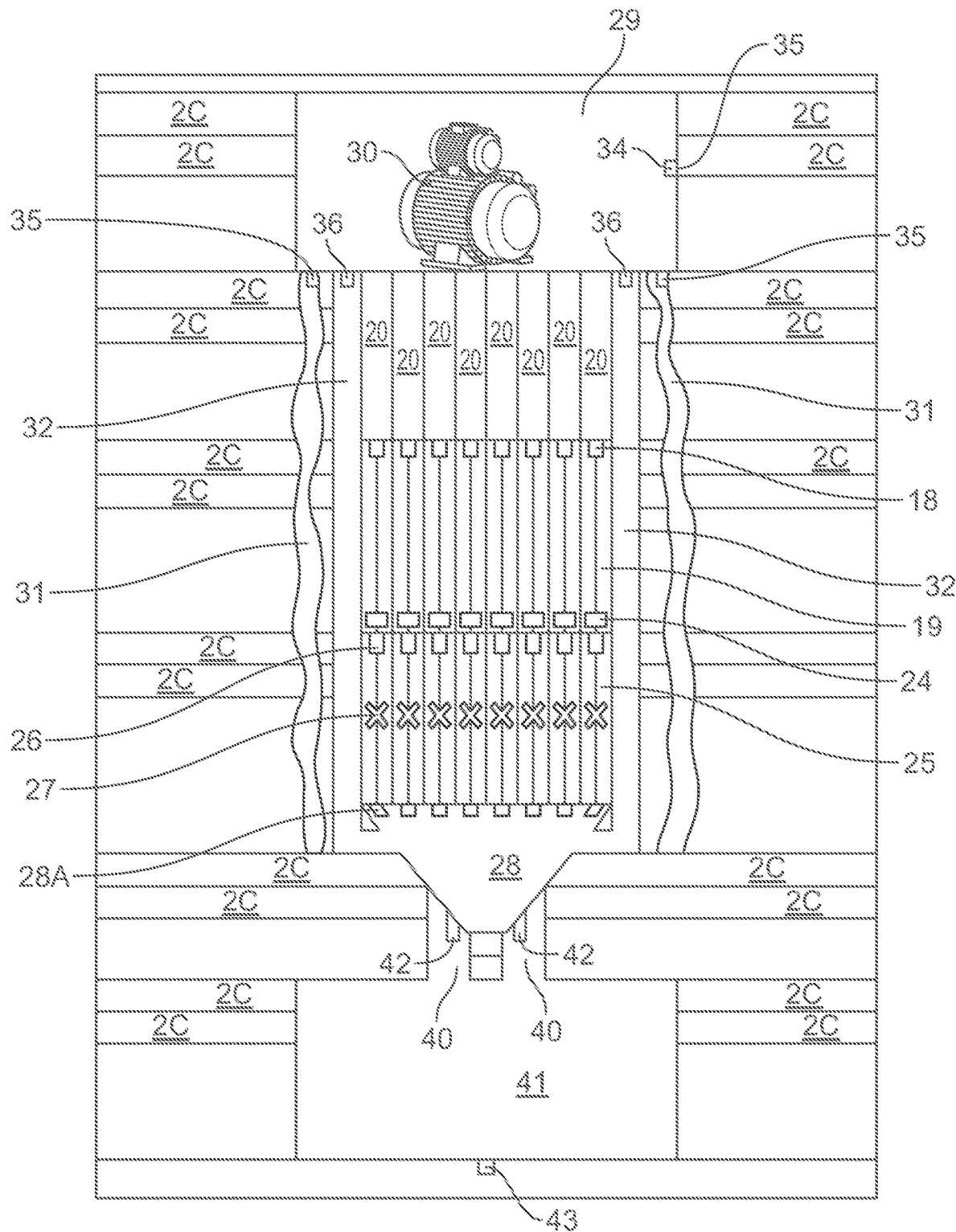
FIG. 10 is a schematic back plan view of the interior of frozen soft-serve confection dispensing machine of FIGS. 8 and 9.

A third embodiment shown in FIGS. 8, 9 and 10 is similar to the embodiment shown in FIGS. 1-3, but has one base hopper 14 and one base cartridges 20. Other than that the arrangement of parts is similar and functions in the same way.

As noted above the various inlet/outlet valves associated with the base cartridges, base hoppers, flavour cartridges, mixing chambers, Storage Slots, etc and the level of the contents in each component can be monitored by a programmable control system and controlled by the use by the Touch Screen Interface 4.

The programmable control system can be hard wired to fully interact with the machine components and/or wireless connected for example through the use of RFID tags, and an RFID transmitter/receiver to communicate with the programmable control system and the display accessible through the Touch-Screen Interface 4. The Touch-Screen Interface 4 can be used to select the flavour as well as the type of base from the available options flavored ice-cream(s), flavored frozen yogurt(s), flavored sorbet(s), and/or flavored gelato(s), concentrated flavor mixes or flavored mixes, ice-cream base(s), frozen yogurt base(s), sorbet base(s), and/or gelato base(s). An sensor with for example and RFID tag can be located on the base cartridge(s), flavour cartridges, base hopper(s), mixing chambers, Storage Slots, final pipe(s), high-pressure water hopper, and dirty water hopper in order to monitor content levels and for the Touch-Screen Interface 4 to display the detected levels of liquid left in those objects.

The programmable control system can be wired (hard wired or wireless) to all of the machine's valves, so the movements of liquids in the machine can be controlled through input to the Touch Screen Interface 4. The mixing units in the mixing chambers, the churners in the Storage Slots, the high-pressure water pump, the punches if any in the flavour cartridge(s), the Credit/Debit Card POS Terminal (if installed), and the refrigeration system, are also wired (hard wired or wireless) to the programmable control system in order to control the various components. The components of the programmable control system are typically insulated in order to operate and withstand the cold temperatures in the machine.

The following description outlines the various screen shots displayed on the Touch Screen Interface and how they can be programmed and input made to control the operation of the dispensing machine.

When first turning on the machine the Touch-Screen Interface 4 will show a Home Screen to the user, as it is the default screen. At the top center of the screen in big fonts will display "Select A Flavor", with a question mark button to the top right side of the screen (Help Button), and flavors that can be chosen from (Flavor Buttons) (default settings will have them named "Flavor 1", "Flavor 2", etc.). Also, there will be a button located at the bottom center of the screen labeled "Pour" (Pour Button), and a wrench icon button located to the bottom right known as the Settings Button.

In addition a Help Button is displayed when pressed will cause a description of what can be done on the current page, to be displayed and explained in detail, to the user. When the Help Button is held, a label stating "Help" will pop up on to the screen (to undo the pop-up, simply press anywhere on the screen).

A Flavor Button is also displayed. Once pressed, the flavor will be selected (1—all flavors available to be dispensed, will be able to be selected, which allows the flavors to swirl once the Pour Button is pressed). When pressed the selected flavor will be outlined, to show the user it has been selected (to undo the selection, press the Flavor Button again). Once held, a description of the flavor, ingredients, Level Indicator, and (if Vending is turned ON) Price Per Amount Indicator will pop on to the screen. A description of the flavor mix and base used to make up the flavor will also appear (to undo the pop-up, simply press anywhere on the screen). These buttons will have their flavor's name and their flavor's Flavor Display on it, and only flavors that are turned ON (from the Flavor Levels Page), alongside their turned ON corresponding base (from the Base Levels Page), will appear on the Home Screen (as Flavor Buttons). If a flavor or it's corresponding base is turned OFF (all flavors and bases, available in the machine, will be turned ON at default settings), it's Flavor Button will not appear on the Home Screen. At default, the Flavor Button will display a text of "Flavor I", "Flavor 28", etc. (depending on the flavor, and how many flavors are available in the machine). In order to change a selected flavor's name, the user would have to go to the Settings Screen via. Flavor Setup—Selected Flavor Setup—Name Setup.

A Pour Button is displayed on the screen and once pressed after a flavor or flavors are selected, the user will be redirected to the Pour Screen, where the user can actually dispense their selected flavor(s). If held, a pop-up stating Pour Button will appear on the screen, (to undo the pop-up, simply press anywhere on the screen). Note: this button has "Pour" labeled on it.

Pour Screen. At the top left of the screen, a half-rounded arrow icon will be displayed known as the Back Button. At the top right of the screen, the Help Button will be displayed, and "Pour Away" will be stated at the top center of the screen. At the bottom center of the screen another pour button will be displayed, however when this one is held, it will dispense the selected flavor(s) on the Pour Screen. The background of the screen will consist of Flavor Displays of the selected flavor, a description, Level Indicator, and ingredients. If two or more flavors are selected, the screen will be split into the number of flavors selected, displaying the individual Flavor Display, description, Level Indicator, and ingredients of one flavor on one side of the screen, and the same for the other flavor(s), just on the other side(s) of the screen (split screen). Until too many flavors are selected for the user to be able to see and read their individual displays, ingredients, Level Indictors, and descriptions. In this case the Flavor Buttons will display, and in order to see a selected flavor's ingredients, Level Indicator, description, and (if Vending is turned ON) Price Per Amount Indicator(s), the user would have to hold the selected flavor's Flavor Button (the Flavor Display(s) will no longer show on the screen).

Also, when the vending function for the machine is ON, the Price Per Amount Buttons for the selected flavor(s) will be displayed on the screen, above the Pour Button. Also, the Price Per Amount Indicators will be shown for each flavor if multiple flavors are selected to be dispensed. When a selected flavor or flavors are displayed on this screen, one of the available Price Per Amount Buttons will need to be selected (or the Price Per Amount Button, if multiple Price Per Amount Buttons are not available), and the amount selected will have to be paid for through the Credit/Debit Card POS Terminal #17, before the user is able to dispense a flavored ice-cream(s), flavored frozen yogurt(s), flavored sorbet(s), and/or flavored gelato(s). Note: if two or more flavored ice-cream(s), flavored frozen yogurt(s), flavored sorbet(s), and/or flavored gelato(s) are selected to dispense with different Price Per Amount Indicators, the actual amount of each flavored ice-cream(s), flavored frozen yogurt(s), flavored sorbet(s), and/or flavored gelato(s), that is selected to be dispensed, and their price per the actual dispensing amount will be added to and shown on the Price Per Amount Button(s).

Price Per Amount Indicators: If Vending is turned ON, this indicator will show on the Pour Screen and when a Flavor Button is held. The indicator will display the different amounts or amount of the specific flavored ice-cream, flavored frozen yogurt, flavored sorbet, and/or flavored gelato, that can be dispensed, and the price per the different dispensing amounts or amount. At default, none of the Price Per Amount Indicators or indicator will display on the Pour Screen or when a Flavor Button is pressed (when Vending for the machine is first turned ON). If the user wishes to turn ON and/or change a, or all of the Price Per Amount Indicators, for a flavor(s) they would need to access Settings—Vending—Selected Flavor's Vending Settings.

Price Per Amount Buttons: If Vending is turned ON, this button(s) will display on the Pour Screen, after a flavored ice cream(s), flavored frozen yogurt(s), flavored sorbet(s), and/or flavored gelato(s) has been selected to dispense from the Home Screen. This button(s) will display the Price Per Amount Indicator(s) for the selected flavor(s), all of the multiple selected flavors will display 1 set of Price Per Amount Buttons, i.e. $0.00 for 0 oz (Extra Small), $0.00 for 0 oz (Small), $0.00 for 0 oz (Medium), $0.00 for 0 oz (Large), $0.00 for 0 oz (Extra-Large). Once one of the buttons are pressed the selected amount will be ready to pour, after the price for the amount is paid for through the Credit/Debit Card POS Terminal #17.

If two or more flavored ice-cream(s), flavored frozen yogurt(s), flavored sorbet(s), and/or flavored gelato(s) are selected to dispense with different Price Per Amount Indicators, the actual amount of each flavored ice-cream(s), flavored frozen yogurt(s), flavored sorbet(s), and/or flavored gelato(s), that is selected to be dispensed, and their price per the actual dispensing amount will be added to and shown on the Price Per Amount Button(s). At default, none of the Price Per Amount Buttons will display on the Pour Screen (when Vending for the machine is first turned ON). If the user wishes to turn ON and/or change a, or all of the Price Per Amount Buttons, for a flavor(s) they would need to change the Price Per Amount Indicator(s) by pressing Settings—Vending—Selected Flavor's Vending Settings.

Back Button: Once pressed, the user will be redirected to the previous page they were originally at and once held, a pop-up of "Back" will display on the screen. (to undo the pop-up, simply press anywhere on the screen). Note: this button has a half-rounded arrow pointing to the left, in it.

Settings Button: Once held, the word "Settings" will pop up on to the Home Screen (to undo the pop-up, simply press anywhere on the screen), once pressed, a pop-up 4-digit numeric field password screen will appear. On this password screen, text stating "Please Enter the Password" will be located at the top center of the screen. A 10-digit password keypad (0-9) with a numeric field, text cursor, backspace key, and enter key will be located at the center of the screen. A Back Button will be located at the left side of the password keypad, and a Help Button located at the right side of the keypad. Once the correct 4-digit password has been entered, the user will be directed to the Settings Screen.

Settings Screen: When first introduced to this screen, a text at the top center of the screen stating "Settings" will be displayed along with a Back Button and Help Button to the left and right side of the text, respectively. A house icon known as the Home Button will be located at the bottom left side of the screen. There will also be multiple touchable texts on the body of the screen such as: Base Levels, Flavor Levels, Base Cartridge Levels, Flavor Cartridge Levels, Water Levels, Base Setup, Flavor Setup, Vending, Ingredients Setup, Flavor Displays, Cleaning Process, Climate Control, Language Setup, Password Setup, and Power. Once any of the listed texts are pressed, the user will be directed to their individual page's.

Home Button: Once pressed, the user will return to the Home Screen, and once held a text stating "Home" will pop up onto the screen (to undo the pop-up, simply press anywhere on the screen). Note: this button consists of a house icon.

Base Levels Page: Once arriving to this page, the user will see "Base Levels" located at the top center of the page with the Back Button, Help Button, Home Button located at the top left, top right, and bottom center of the page (respectively). At the middle of this page the user will see a touchable text for each Base Hopper #4 in the machine, and at default settings (before changing the touchable text names on the Base Setup Page) the touchable texts will be labeled (depending on how many Base Hoppers #4 are in the machine) "Base 1 Level", "Base 2 Level", "Base 3 Level", "Base 4 Level", etc. (respectively) (the number order goes correspondingly from the left-hand to the right-hand side of the machine, when looking from the back of the machine). Once one of the listed touchable texts are pressed, the user will be directed to their individual page. Note: machines with only one base hopper 14 will display Base Level, machines with only two base hoppers 14 will display Base 1 Level and Base 2 Level, at this page for their machine. (It all depends on the number of Base Hopper's 14 in the machine).

Base 1, Base 4, etc. Level Pages: Once the user arrives at any of these pages, they will see (depending on which touchable text was pressed) "Base 1 Level", "Base 2 Level", "Base 3 Level", "Base 4 Level", etc. at the top center of the page, with a Back Button, Help Button, and Home Button located to the top left, top right, and bottom center of the page (respectively). If the name of a base was changed, the user will see the changed name, followed by a dash and depending on which corresponding touchable text was pressed, "Base 1 Level", "Base 2 Level", "Base 3 Level", "Base 4 Level", etc. at the top center of the page. At the body of the page, the user will see a Level Indicator, Wash Button, and a ON/OFF Button.

Level Indicator lets the user know the level of liquid inside the Base Cartridge(s), Base Hopper(s), Storage Slots, High-Pressure Water Hopper, Flavour Cartridges, and Dirty Water Hopper, by displaying a percentage indicator (0-100% Full). This indicator is a representation of one of the specific sensors (located on one of the hoppers, slots, or cartridges) communication with the programmable control system operated through the Touch-Screen Interface). For example if a user wants to know how much plain base is in the machine the Level Indicator will display the information.

Wash Button: Once the Wash Button displayed on the Touch Screen Interface 4 is pressed and held, "Wash" will appear on the screen, and after connecting a High-Pressure Water Hose to the selected base's base hopper 14 or selected flavour's mixing chamber, the user wants to wash, the Wash Button can be pressed. Once the button is pressed, the selected flavor or base will be washed (Washing Process). If a High-Pressure Water Hose is not connected to the correct selected base's base hopper 14 or selected mixing chamber, the user is trying to clean, the Washing Process will not commence. If the Wash Button for high-pressure water or dirty water is pressed, a High-Pressure Water Hose will not have to be connected, for the Washing Process to initiate. The button's icon is a circular button with an image of water in it.

The control system is preferably programmed so the Wash Buttons will automatically deselect after, 15 minutes of washing for bases, high pressure water, and dirty water, but 7 minutes for a flavor, as that is how long the Washing Process lasts for each. They can also be pressed again at any time, to stop a Washing Process.

ON/OFF Button: Once pressed, the machine or the specified item/liquid will be turned ON or OFF. Once turned ON, the specified item/liquid will be ON and ready for use, and/or by the Touch-Screen Interface 4 allowing the selected item's/liquid's outlet valves to be opened upon request. Once turned OFF, the specified item/liquid will be OFF and disabled for use, and/or by control system shutting the selected item's/liquid's outlet, until turned back ON. This button's icon is a circular button with an image of the generic ON/OFF button in it. At default an item is usually turned ON at first, until turned OFF manually.

Base Cartridge Levels Page: Once arriving to this page, the user will see "Base Cartridge Levels" located at the top center of the page with the Back Button, Help Button, Home Button located at the top left, top right, and bottom center of the page (respectively). At the middle of this page the user will see a touchable text for each Base Cartridge #1 that can be placed in the machine, and at default settings (before changing the touchable text name(s) on the Base Setup Page) the touchable text(s) will be labeled "Base Cartridge 1 Level", "Base Cartridge 2 Level", "Base Cartridge 3 Level", "Base Cartridge 4 Level", etc. (respectively) (the number order goes correspondingly from the left-hand to the right-hand side of the machine, when looking from the back of the machine). Once one of the listed touchable text(s) is pressed, the user will be directed to their individual page.

Base Cartridge 1, Base Cartridge 4, etc. Level Pages: Once the user arrives to this page, they will see (depending on which touchable text was pressed) "Base Cartridge 1 Level", "Base Cartridge 2 Level", "Base Cartridge 3 Level", "Base Cartridge 4 Level", or etc. at the top center of the page, with a Back Button, Help Button, and Home Button located to the top left, top right, and bottom center of the page (respectively). If the name of a base was changed, the user will see the changed name, followed by a dash and depending on which corresponding touchable text was pressed, "Base Cartridge 1 Level", "Base Cartridge 2 Level", "Base Cartridge 3 Level", "Base Cartridge 4 Level" or etc. at the top center of the page. At the body of the page, the user will see a Level Indicator, and a ON/OFF Button.

Flavour Levels Page: Once arriving to this page, the user will see "Flavor Levels" located at the top center of the page with the Back Button, Help Button, Home Button located at the top left, top right, and bottom center of the page (respectively). At the middle of this page the user will see a touchable text for each Storage Slot in the machine, and at default settings (before changing the touchable text names on the Flavor Setup Page) the touchable texts will be labeled "Flavor 1 Level", "Flavor 28 Level", etc. respectively (the number order goes correspondingly from the left-hand to the right-hand side of the machine, when looking from the back of the machine). Once one of the listed touchable texts are pressed, the user will be directed to their individual page. Note: the number of Storage Slots varies for each machine, some might have 7, 8, 9, or even 10 for each Base Hopper 14 in the machine.

Flavor 1, Flavor 28, etc. Level Pages: Once the user arrives to this page, they will see, depending on which touchable text was pressed, "Flavor 1 Level", "Flavor 28 Level", etc. at the top center of the page, with a Back Button, Help Button, and Home Button located to the top left, top right, and bottom center of the page, respectively. If the name of a flavor was changed, the user will see the changed name, followed by a dash and depending on which corresponding touchable text was pressed, "Flavor 1 Level", "Flavor 28 Level", etc. at the top center of the page. At the body of the page, the user will see a Level Indicator, Wash Button, and a ON/OFF Button.

Flavor Cartridge Levels Page: Once arriving to this page, the user will see "Flavor Cartridge Levels" located at the top center of the page with the Back Button, Help Button, Home Button located at the top left, top right, and bottom center of the page (respectively). At the middle of this page the user will see a touchable text for each Flavor Cartridge 20 that can be placed in the machine, and at default settings the touchable texts will be labeled "Flavor Cartridge 1 Level", "Flavor Cartridge 28 Level", etc. respectively (the number order goes correspondingly from the left-hand to the right-hand side of the machine, when looking from the back of the machine). Once one of the listed touchable texts are pressed, the user will be directed to their individual page.

Flavor Cartridge 1, Flavor Cartridge 28, etc. Level Pages: Once the user arrives to this page, they will see, depending on which touchable text was pressed, "Flavor Cartridge 1 Level", "Flavor Cartridge 28 Level", etc. at the top center of the page, with a Back Button, Help Button, and Home Button located to the top left, top right, and bottom center of the page (respectively). If the name of a flavor was changed, the user will see the changed name, followed by a dash and depending on which corresponding touchable text was pressed, "Flavor Cartridge 1 Level", "Flavor Cartridge 28 Level", etc. at the top center of the page. At the body of the page, the user will see a Level Indicator, a ON/OFF Button, and a Name Setup touchable text. Note: the number of Flavor Cartridges 20 varies for each machine, some might have 7, 8, 9, or even 10 for each Base Hopper 14 in their machine.

Water Levels Page: Upon first arriving to the page, the user will see the words "Water Levels" at the top center of the page, with a Back Button located to the top left, a Help Button located to the top right, and a Home Button located at the bottom center of the page, respectively. At the body of the page, two touchable texts labeled "High-Pressure Water Level" and "Dirty Water Level" will be displayed, and once one of the two texts are pressed, the user will be directed to their individual pages.

High-Pressure Water Level Page: Once the user arrives to this page, they will see "High-Pressure Water Level" at the top center of the page, with a Back Button, Help Button, and Home Button located to the top left, top right, and bottom center of the page, respectively. At the body of the page, the user will see a Level Indicator, Wash Button, and an ON/OFF Button.

Dirty Water Level Page: Once the user arrives to this page, they will see "Dirty Water Level" at the top center of the page, with a Back Button, Help Button, and Home Button located to the top left, top right, and bottom center of the page, respectively. At the body of the page, the user will see a Level Indicator, Wash Button, and an ON/OFF Button.

Base Setup Page: Once the user arrives to this page, they will see "Base Setup" at the top center of the page, with a Back Button, Help Button, and Home Button located to the top left, top right, and bottom center of the page, respectively. At the body of the page, touchable text(s) (depending on how many Base Hoppers 14 are in the machine) labeled "Base 1 Setup", "Base 2 Setup", "Base 3 Setup", "Base 4 Setup", etc. will be displayed, and once pressed, the user will be directed to the text's individual pages. Note: the names of the touchable texts are due to default settings otherwise the changed name would be displayed, the number order goes correspondingly from the left-hand to the right-hand side of the machine, when looking from the back of the machine. Note: machines with only one Base Hopper 14 will display Base Setup, machines with only two Base Hoppers 14 will display Base 1 Setup and Base 2 Setup, at this page for their machine. (It all depends on the number of Base Hopper's 14 in the machine).

Base 1 Setup, Base 4 Setup, etc. Pages: Once the user arrives to this page, they will see (depending on which touchable text was pressed) "Base 1 Setup", "Base 4 Setup", etc. at the top center of the page, with a Back Button, Help Button, and Home Button located to the top left, top right, and bottom center of the page, respectively. If the name of a base was changed, the user will see the changed name, followed by a dash and depending on which corresponding touchable text was pressed, "Base 1 Setup", "Base 2 Setup", "Base 3 Setup", "Base 4 Setup", etc. at the top center of the page. At the body of the page, 2 touchable texts labeled Name Setup and Drop Setup will be displayed, and once pressed, the user will be directed to the text's individual page.

Name Setup Page: Once the user arrives to this page, they will see "Name Setup" at the top center of the page, with a Back Button, Help Button, and Home Button located to the top left, top right, and bottom center of the page (respectively). The body of the page will show the base or flavor's name setup, the user is at by showing their default name e.g. "Base 1", "Base 2", "Flavor 1", "Flavor 2", etc. Also, a text stating "Current Name:" will be shown alongside the current name of the base or flavor e.g. "Base 1", "Plain Base", "Flavor 1", "Vanilla", etc. Note: the default names for bases would be Base 1, Base 4, etc. and for flavors it would be Flavor 1, Flavor 28, etc.

The last two texts on the Name Setup Page are touchable texts, Reset Name, and Change Name. Once the Reset Name touchable text has been pressed, the base or flavor's name will reset to their default one e.g. "Base 1", "Flavor 1", Base 3, etc., correspondingly of course (if the name was never changed, to begin with, this touchable text will have no effect). Once Change Name has been selected, a touch screen keyboard with a text field, text cursor, letters A-Z keys, numbers 0-9 keys, a space key, backspace key, and enter key will pop-up on the screen. Once the user is done changing the name, all they will have to do is press enter, the pop-up keyboard will disappear, and the name for the selected base or flavor will change.

Drop Setup Page: Once the user arrives to this page, they will see "Drop Setup" at the top center of the page, with a Back Button, Help Button, and Home Button located to the top left, top right, and bottom center of the page (respectively). The body of the page will consist of the base or flavor's drop setup, the user is at e.g. "Base 1", "Base 2", "Flavor 1", "Flavor 2", etc. Also, a text stating "Current Drop Level:" will be shown alongside the actual current drop level of the base or flavor e.g. for base "32 oz", for flavor "15 m l", etc. Note: the default drop level for any base would be 64 oz, and for any flavor would be 6 ml (base drop levels are in ounces, and flavor drop levels are in millilitres). Note: a drop level is the amount of base and flavor that will be dropped into the mixing chamber from their respective Base Hopper 14 and Flavour Cartridge 20, to create a flavored ice-cream, flavored frozen yogurt, flavored sorbet, or flavored gelato.

The last two texts on the Drop Setup Page are touchable texts, Reset Drop Level, and Change Drop Level. Once the Reset Drop Level touchable text has been pressed, the base and flavor's drop level will reset to their normal ones, for bases it would be 64 oz, and for flavors it would be 6 ml (if the drop level was never changed, to begin with, this touchable text will have no effect). Once Change Drop Level has been selected, a pop-up screen (for bases) with 10-64 oz drop levels to choose from, alongside a pop-up screen (for flavors) with 1-30 ml drop levels to choose from will appear on the screen. The pop-up for either bases or flavors will also have an enter key on it. To select a drop level, the user would just have to touch it on the screen, it will be circled once touched, and remain that way until changed (to deselect a drop level, simply tap the selected drop level again). Once the user is done changing the selected drop level, all they will have to do is press the enter key, the pop-up screen will disappear, and the drop level for the selected base or flavor will change.

Flavor Setup Page: When the user arrives to this page, they will see "Flavor Setup" at the top center of the page, with a Back Button, Help Button, and Home Button located to the top left, top right, and bottom center of the page (respectively). At the body of the page, touchable texts (for each flavors) labeled "Flavor 1 Setup", "Flavor 28 Setup", etc. will be displayed, and once pressed, the user will be directed to the text's individual page. Note: the names listed are due to default settings, otherwise the changed name would be displayed. The number order goes correspondingly from the left-hand to the right-hand side of the machine, when looking from the back of the machine. Note: the number of flavors that can be made, varies for each machine, some might have 7, 8, 9, or even 10 Storage Slots 25 for each Base Hopper 14 in their machine.

Flavor 1 Setup, Flavor 28, etc. Setup Pages: Once the user arrives to this page, they will see (depending on which touchable text was pressed) "Flavor 1 Setup", "Flavor 28 Setup", etc. at the top center of the page, with a Back Button, Help Button, and Home Button located to the top left, top right, and bottom center of the page, respectively. If the name of a flavor was changed, the user will see the changed name, followed by a dash and depending on which corresponding touchable text was pressed, "Flavor 1 Setup", "Flavor 28 Setup", etc. at the top center of the page. At the body of the page, 2 touchable texts labeled Name Setup and Drop Setup will be displayed, and once pressed, the user will be directed to the text's individual page. Note: the number of flavors that can be made, varies for each machine, some might have 7, 8, 9, or even 10 storage slots 25 for each Base Hopper 14 in their machine.

Vending Page: Once the user arrives to this page, they will see "Vending" at the top center of the page, with a Back Button, Help Button, and Home Button located to the top left, top right, and bottom center of the page, respectively. At the body of the page, a ON/OFF Button will be displayed (once the button is pressed and turned ON, the vending function of the machine will enable, when the button is turned OFF, the vending function of the machine will disable), and multiple touchable texts (for each flavor) labeled "Flavor 1 Vending Setup", "Flavor 28 Vending Setup", etc. will be displayed, and once pressed, the user will be directed to the text's individual page. Note: the names listed are due to default settings, otherwise the changed name would be displayed. The number order goes correspondingly from the left-hand to the right-hand side of the machine, when looking from the back of the machine. Note: the number of flavors that can be made, varies for each machine, some might have 7, 8, 9, or even 10 Storage Slots 25 for each Base Hopper 14 in their machine.

Flavor 1 Vending Setup, Flavor 28 Vending Setup, etc. Pages: Once the user arrives to this page, they will see (depending on which touchable text was pressed) "Flavor 1 Vending Setup", "Flavor 28 Vending Setup", etc., at the top center of the page, with a Back Button, Help Button, and Home Button located to the top left, top right, and bottom center of the page, respectively. If the name of a flavor was changed, the user will see the changed name, followed by a dash and depending on which corresponding touchable text was pressed, "Flavor 1 Vending Setup", "Flavor 28 Vending Setup", etc., at the top center of the page. At the body of the page, a text labeled Price Per Amount Indicator will be displayed, with the actual Price Per Amount Indicators located below the text, displaying $0.00 for 0 oz (Extra Small), $0.00 for 0 oz (Small), $0.00 for 0 oz (Medium), $0.00 for 0 oz (Large), $0.00 for 0 oz (Extra-Large), with a ON/OFF Button, set to OFF beside each of the Price Per Amount Indicators (at default settings). Once one of the ON/OFF Buttons, beside one of the Price Per Amount Indicators is pressed and the button is turned ON, the Price Per Amount Indicator will display on the Pour Screen, and when the corresponding flavor's Flavor Button is held. Also, the corresponding Price Per Amount Button will display on the Pour Screen. Once the ON/OFF Button, beside one of the Price Per Amount Indicators is pressed and the button is turned OFF, the Price Per Amount Indicator will not display on the Pour Screen, or when a Flavor Button is held. Also, the corresponding Price Per Amount Button will not display on the Pour Screen.

Once a price indicator ($0.00) is touched, a pop-up 5-digit numeric field keypad will appear with a 10-digit numeric keypad (0-9), numeric field, text cursor, backspace key, and enter key. A Back Button will be located at the left side of the keypad, and a Help Button located at the right side of the keypad. Once an amount indicator (0 oz) is touched, a pop-up 3-digit numeric field keypad will appear with a 10-digit numeric keypad (0-9), numeric field, text cursor, backspace key, and enter key. A Back Button will be located at the left side of the keypad, and a Help Button located at the right side of the keypad. After the user is done editing the Price Per Amount Indicators, the newly saved Price Per Amount Indicators will display on the Pour Screen, when the Flavor Buttons are held, and on their corresponding Price Per Amount Buttons. Note: the number of flavors that can be made, varies for each machine, some might have 7, 8, 9, or even 10 Storage Slots 25 for each Base Hopper 14 in their machine.

Ingredients Setup Page: Once the user arrives to this page, they will see "Ingredients Setup" at the top center of the page, with a Back Button, Help Button, and Home Button located to the top left, top right, and bottom center of the page, respectively. At the body of the page, touchable texts (for each flavored soft serve available to be dispensed from the machine) will be displayed e.g. "Flavor I", "Flavor 28", etc. If the name of a flavor was changed, the user will see the changed name. Once any of the touchable texts are pressed, a pop-up screen (for the selected flavor) will appear showing a fillable digital nutrition facts label, and a Back Button. The nutrition facts label will be a standard Canadian one, with both English and French translations for the nutritional facts (the French Translation can be turned OFF and/or replaced by a different translation language).

The nutrition facts label will also have a slot under it, labeled "Other Ingredients" that can be filled by the user. Once a user taps any of the nutrition facts slot's, a touch screen keyboard with letters A-Z keys, numbers 0-9 keys, a space key, backspace key, and enter key will pop-up on the screen. The tapped slot will show a blinking cursor at the end of a word(s)/number(s) or at the beginning of the blank space the user tapped. Once the user is done changing the nutrition facts, all they will have to do is press enter, the pop-up keyboard will disappear, and the nutrition facts for the selected flavored soft serve will change. Note: the number of flavors that can be made, varies for each machine, some might have 7, 8, 9, or even 10 Flavour Cartridges 20 for each Base Hopper in the machine.

Flavor Displays Page: Once the user arrives to this page, they will see "Flavor Displays" at the top center of the page, with a Back Button, Help Button, and Home Button located to the top left, top right, and bottom center of the page, respectively. At the body of the page, touchable texts (for each flavored soft serve available to be dispensed from the machine) will be displayed e.g. "Flavor 1 Display Page", "Flavor 28 Display Page", etc. If the name of a flavor was changed, the user will see the changed name in front of "Display Page". Once any of the touchable texts are pressed, the user will be directed to the flavor's individual flavor displays page. At the bottom left of the page a touchable text labeled "Upload Flavor Display" will be shown, once pressed the user will be redirected to that page.

Flavor 1, Flavor 28, etc. Flavor Display Pages: Once the user arrives to any of these pages, they will see "Flavor 1 Display", "Flavor 28 Display", etc. (depending on the flavor selected) at the top center of the page, with a Back Button, Help Button, and Home Button located to the top left, top right, and bottom center of the page (respectively). If the name of a flavor was changed, the user will see the changed name, followed by a dash and depending on which corresponding touchable text was pressed, "Flavor 1 Display", "Flavor 28 Display", etc. at the top center of the page. At the body of the page, up to forty default labeled flavor displays will be available to choose from e.g. vanilla ice-cream display, chocolate frozen yogurt display, green apple sorbet display, cherry gelato display, etc. To choose one, the user would simply have to tap the display they want, and it will be circled/selected (to deselect a display, tap the selected display again). These displays will be shown on the selected flavor's Pour Screen and their Flavor Button (if two or more flavors are selected to be poured, the Pour Screen will split, with one flavor's display shown on one side and the other flavors' displays shown on the other sides of the screen). Note: once too many flavors are selected, for the Pour Screen to show each individual flavors' flavor display, the Pour Screen will show the selected flavors' Flavor Buttons instead. If the user would like to delete any of the flavor displays (default ones cannot be deleted), all they would have to do is hold the flavor display they wish to delete, and a pop-up touchable text stating "delete" will appear on the screen, once pressed the selected flavor display will be deleted from the Touch-Screen Interface's 4 memory.

Upload Flavor Display Page: Once the user arrives to this page, they will see "Upload Flavor Display" at the top center of the page, with a Back Button, Help Button, and Home Button located to the top left, top right, and bottom center of the page (respectively). For a user to upload a display, they would have to save the animation on a USB drive and attach it directly to the Touch-Screen Interface's 4 USB slot. Once that has been done, at the body of the Upload Flavor Display Page, the user will see the USG's files. Once the files are pressed, the image would pop-up onto the screen and the user will see a Save Flavor Display Button at the top center of the page, with a Back Button, Help Button, and Home Button located to the top left, top right, and bottom center of the page (respectively). Once the Save Flavor Display Button is pressed, the flavor display will be saved onto the Touch-Screen Interface's 4 memory, the pop-up will disappear, and the user will be back at the Flavor Displays Page. The newly saved flavor display will be available on any of the Flavor 1, Flavor 28, etc. Flavor Display Pages.

Cleaning Process Page: Once the user arrives to this page, they will see "Cleaning Process" at the top center of the page, with a Back Button, Help Button, and Home Button located to the top left, top right, and bottom center of the page (respectively). At the body of the page, touchable texts (for each flavored soft serve, available to be dispensed from the machine) will be displayed, "Flavor 1", "Flavor 28", etc. If the name of a flavored soft serve was changed, the user will see the changed name, followed by a dash and their corresponding default flavor name, "Flavor 1", "Flavor 28", etc. Once a flavor is selected a pop-up showing 5-30 seconds options will appear on the screen (time for the cleaning process to last, after the selected flavor has been dispensed). The same could be done for any of the touchable texts (flavors) on this page. Once a time is selected, the pop-up screen will disappear. The default time for each flavor will be 15 seconds. Note: a time cannot be deselected, to deselect a time the user would need to press a different time from the listed options.

Climate Control Page: Once the user arrives to this page, they will see "Climate Control" at the top center of the page, with a Back Button, Help Button, and Home Button located to the top left, top right, and bottom center of the page (respectively). At the body of the page, there will be 2 touchable texts: Interior Temperature, and Flavor Slots' Temperature, when either of them are touched, a pop-up digital thermostat with up and down buttons, current temperature indicator, and an enter button will appear on the screen. The Interior Temperature levels can be adjusted from up to 5° C. to −10° C., and Flavor Slots' Temperature levels can be adjusted from up to 0° C. to −17° C. The default refrigeration settings will have the interior of the machine's temperature at 4.4° C., and the Storage Slots' temperature at −14° C.

Language Setup Page: Once the user arrives to this page, they will see "Language Setup" at the top center of the page, with a Back Button, Help Button, and Home Button located to the top left, top right, and bottom center of the page (respectively). At the body of the page, numerous different languages, will be displayed, once any of them are pressed, they will be selected, and a pop-up enter button will appear on the screen. Once the enter button is pressed, the language of the machine will change to the selected language. The default language of the machine will be English. Note: when a different language is selected, their letters will replace all of the lettered keys on the various keypads.

Password Setup Page: Once the user arrives to this page, they will see "Setup/Change Password" at the top center of the page, with a Back Button, Help Button, and Home Button located to the top left, top right, and bottom center of the page (respectively). When first setting up, there will be no password for the machine, so the body of the page will show a text stating "Enter the New Password" with a touch screen 4-digit password keyboard with a numeric field, text cursor, numbers 0-9 keys, a space key, backspace key, and enter key under it. Once a password has been entered, the user will be redirected to the Settings Screen.

When changing the password, (after the first ever password for the machine has been entered) the body of the page will show a text stating "Please Enter the Password", with a touch screen 4-digit password keyboard with a numeric field, text cursor, numbers 0-9 keys, a space key, backspace key, and an enter key under it. Once the correct password has been entered, the user will have to "Enter New Password" (this will be labeled at the body of the page instead of "Please Enter the Password"). Once the new password has been entered the user will return to the Settings Screen. If the user forgets their password and would like to have it reset, they would have to call the manufacturer.

Power Page: Upon arriving to this page, the user will see "Power" at the top center of the page, with a Back Button, Help Button, and Home Button located to the top left, top right, and bottom center of the page (respectively). The body of the page will consist of, a ON/OFF Button, and a Standby Mode Button. This ON/OFF Button when pressed, will turn the entire machine OFF (The machine can be turned back ON by pressing the physical power button along the Touch-Screen Interface).

Standby Mode Button: The button's icon will be made up of a circular button with a half-moon logo inside of it once the button is held a pop-up "Standby Mode" will appear onto the screen. Once pressed, the machine will not mix/create flavors, or be able to pour existing flavors, only the Touch-Screen Interface will be able to be used. In Standby mode, the machine will be operating at a low power, and that power will only be used for refrigerating the machines contents, to keep them fresh (the power will also be used to keep the Touch-Screen Interface working). Once in standby mode, the standby mode icon will appear on the Home Screen, to make sure the user is aware of the machine's present state.

All of the connections from the Touch-Screen Interface 4, all of the Mixing Chambers, all of the Storage Slot's churners, the High-Pressure Water Pump, the punch if any in the Flavour Cartridge(s), the Credit/Debit Card POS Terminal, and the Refrigeration System will ultimately be powered through the final Power Cord. When this cord is plugged in to an outlet, electric power will be brought to all of the listed objects, and their counterparts. When this cord is unplugged from an outlet, electric power will be taken away from all of the listed objects. Note: this cord will be extreme weather resistant.

A refrigeration system 50 including a refrigeration pump 52 and compact condenser is provided and in the embodiments shown is located at the bottom of the machine's interior and attached to the machine's back door. The copper refrigeration tubes 53 can be extended all the way to the top of the Flavour Cartridges. The copper refrigeration tubes will also be attached to the back door of the machine, so when the door opens, the copper pipes will be out of the way. The temperature of this Refrigeration System will be controlled by the control system and can be displayed and adjusted using the Touch-Screen Interface 4 via. Settings—Climate Control.

Preferably there will be two temperatures controlled, the temperature of the overall machine, and the temperature of the Storage Slots via. Settings—Climate Control—Interior Temperature or Storage Slots' Temperature. Generally, the temperature for the Storage Slots will be colder than the rest of the machine, this is due to the importance of sustaining the slot's inner contents (finished soft serve). The section of the machine carrying the Storage Slots will be isolated from the refrigeration of the rest of the machine by being cold insulated and having the other copper refrigeration tubes running through their section of the machine. The default refrigeration settings will have the entire interior of the machine's temperature at 4.4° C., and the Storage Slots' temperature at −14 C.

As noted above the machine functions are controlled by using the Touch-Screen Interface 4, by having the interface 4 and the programmable control system connected to all of the valves in the machine, and by providing the Touch-Screen Interface 4 with a wireless capability through use of an wireless receiver transmitter for example using RF, Bluetooth or other known connectivity. The various inlet/outlet vales in the machine as described above generally permit and control the movement of the flavored ice creams, flavored frozen yogurts, flavored sorbets, and/or flavored gelatos, ice cream base(s), frozen yogurt base(s), sorbet base(s), and/or gelato base(s), concentrated flavor mixes or flavored mixes, and water through the machine. The Touch-Screen Interface 4, when connected to the various inlet/outlet valves, controls which and when each valve permits contents to move through the machine.

The sensors located on different areas of the machine, monitor how much flavored ice cream, flavored frozen yogurt, flavored sorbet, and/or flavored gelato, ice cream base, frozen yogurt base, sorbet base, and/or gelato base, concentrated flavor mix or flavored mix, and water there is in their designated areas. The Touch-Screen Interface 4 has the ability to display the information the sensors are reading. The sensors wirelessly communicate their information to the wireless transmitters. The Touch-Screen Interface 4 can also be wired to a Credit/Debit Card POS Terminal 5, in order to vend a specified amount(s) of selected flavored ice-cream(s), flavored frozen yogurt(s), flavored sorbet(s), and/or flavored gelato(s) for a specified price(s). The entire interior of the machine is refrigerated by the Refrigeration System, the system does however produce colder air for the Storage Slots because they hold the finished mixed flavor and base product of ice cream gelato, sorbet and/or frozen yogurt (so the mixed liquid can turn into soft serve). The machine's power cord will have to be plugged in for the machine to work, when unplugged, the Touch-Screen Interface 4 will still keep memory of all the last saved settings, unless manually restored to default settings. The Touch-Screen Interface 4, mixing chambers, refrigeration system, churners in the Storage Slots, the High-Pressure Water Pump, the alternate Flavor Cartridge(s), and (if installed) Credit/Debit Card POS Terminal are electrically powered. Also, the machine can come in various sizes, ranging from a four-base hopper, two-base hopper, and even a single base hopper design. The sizes of the machines can range from 6 feet tall by 4 feet wide by 4 feet depth, to 4 feet tall by 4 feet wide by 4 feet depth, and 3 feet tall by 3 feet wide by 3 feet depth (respectively).

How It Works—Initial Setup

When first introduced to the machine, the top lid of the machine must be opened and a Base Cartridge 10 will need to be attached to a Base Hopper 14 (in order to get the base of the ice cream, frozen yogurt, sorbet, and/or gelato into the machine). One can also (if available) attach Base Cartridges 10 to the remaining Base Hoppers 14 (if available). The user can check the level of the Base Cartridge 10 through the Touch-Screen Interface 4, via. Settings—Base Cartridge Levels.

Then the machine will dispense the contents from the Base Cartridge 10 into the Base Hopper 14 through a dispensing valve 13, the cartridge can then be detached and/or replaced by another Base Cartridge 10. The dispensing valve 13 will continue to permit the flow of the contents from the base Cartridges 10 until the Base Hopper 14 is 100% full (or until the cartridge is at 0% full), the remaining contents will be dispensed when the Base Hopper 14 is 50% full, (this information will be available on the Touch-Screen Interface 4 via. Settings—Base Levels, until then the dispensing valve 13 will remain shut.

Then a Flavor Cartridge 20 needs to be attached to the top of a mixing chamber 19 (Flavour Cartridges 20 can also be attached to the remaining spots on top of the mixing chambers 19). Sensors on the cartridges will let the user know how much content is in the cartridge (this information will be available on the Touch-Screen Interface 4 via. Settings—Flavor Cartridge Levels). Then the user will have to access the Touch-Screen Interface 4, go to Settings, tap Base Setup, choose the intended base (Base Hopper 14), change the base's name (by tapping Change Name) and more importantly, determine the base's Drop Level (how much base is dispensed in ounces in a mixing chamber 19, the hopper 14 is connected to, at a time), the same can be done for the rest of the bases available in the machine. The same must be performed for each flavor cartridge 20, the user must access the Touch-Screen Interface 4, go to Settings, tap Flavor Setup, choose the intended flavor, change the flavor's name, and more importantly, determine the flavor's Drop Level (how much flavor is dispensed in milliliters in a mixing chamber 19, the cartridge is connected to, at a time), the same can be done for the rest of the flavors.

Each Mixing Chamber's 19 controlled valve 21 will permit a certain amount of content to exit the mixing chamber 19 at a time before it shuts and stops the flow. This is done to let the mixing chambers 19 to thoroughly mix a dispensed amount of flavor and base into one solution. The Flavour Cartridge's 20 controlled outlet valve 26 that opens to allow the concentrated flavour mix has outlets about one millilitre in diameter, while the other control valve from the base hopper 14 are about 3 millilitres in diameter. After the Drop Level amounts have entered the mixing chamber 19, the blending unit 24 will spend 10-15 seconds, mixing the two contents into a homogeneous mixture. That mixture will then drop into the associated Storage Slot 25 as the valve 26 from the mixing chamber 19 opens up. Once the mixed liquid has left the mixing chamber 19 and has entered the Storage Slot 25, the same mixing process, explained in the previous paragraphs will continue, until the Storage Slot 25, is 100% full. Mixing in the mixing chamber 19 will then only start mixing again, once the Storage Slot 25 is 50% full (this information can be found on the Touch-Screen Interface 4 via. Settings—Flavor Levels). This whole process can be done simultaneously for each and every flavor in the machine e.g. cookie & cream flavor and plain base, vanilla flavor and plain base, peanut butter flavor and chocolate base, etc. can all be getting mixed at once. This can occur because every Flavor Cartridge 20 is separated and have their own dedicated mixing chambers and Storage Slots.

Once the mixed liquid has been passed down and has entered the Storage Slot 25, the liquid will quickly turn into ice cream, frozen yogurt, gelato, or sorbet. This process will quickly commence due to the Storage Slot's 25 two main features. It's first feature is, the entire slot is refrigerated to a different temperature than the rest of the machine (usually −17° to −14° C.). Second, the Storage Slot 25 has a churner unit 27 along the center portion of the storage slot's interior. The churner 27, which is electrically powered, will churn only the contents in the Storage Slot 25 for 15 seconds every 10 minutes, and every time the Storage Slot 25 is selected to dispense their contents (through the Touch-Screen Interface 4 via. Flavor—Pour Button). Every Storage Slot 25 will have the same features and functions.

How It Works—Operation

After a flavored ice cream(s), flavored frozen yogurt(s), flavored sorbet(s), and/or flavored gelato(s) is selected, and the Pour Button on the Pour Screen, is being pressed/held through the Touch-Screen Interface 4 outlet valve 25A, located at the bottom of the selected flavor's(s') Storage Slot(s) 25, and the final/exterior Dispensing Valve 6 (at the bottom of the Final Pipe 28 merger) will be opened. This action will allow the selected flavor(s) to be dispensed and delivered to the final consumer. Once the Pour Button is pressed/held, the outlet valve, located under the Storage Slot(s) 25, for the selected flavor(s), will open and release the contents into the connected Final Pipe(s) 28. The Final Pipe(s) 28 will carry the flavor(s) through the final Dispensing Valve 6, until the Pour Button is released, resulting in the valves under the Storage Slot(s) 25 and Final Pipe(s) 28 to close. The flavored ice cream(s), flavored frozen yogurt(s), flavored sorbet(s), and/or flavored gelato(s) contents that were left in the Final Pipe(s) 28, after the Dispensing Valve 6 is shut, will stay there until the user returns to the Home Screen.

Once the user has returned to the Home Screen, the Cleaning Process will commence. The excess flavored ice cream(s), flavored frozen yogurt(s), flavored sorbet(s), and/or flavored gelato(s) left in the Final Pipe(s) 28 will be rinsed by the High-Pressure Water Pipe(s). That excess liquid will drip down into the Dirty Water Pipes. The complete sanitization of the Final Pipe(s) 28 will be the result of the Cleaning Process. The process itself, happens automatically once the user has finished dispensing their flavored ice cream(s), flavored frozen yogurt(s), flavored sorbet(s), and/or flavored gelato(s) and has returned to the Home Screen. The process will take up to 15 seconds (at default settings), and no flavored ice cream(s), flavored frozen yogurt(s), flavored sorbet(s), and/or flavored gelato(s) will be able to pour out of the machine until the cleaning is finished (the amount of time taken for the Cleaning Process can be adjusted for each flavored ice cream(s), flavored frozen yogurt(s), flavored sorbet(s), and/or flavored gelato(s) through the Touch-Screen Interface 4 via. Settings-Cleaning Process). If a user reaches the Pour Screen before the Cleaning Process is complete, a lock icon (indicating no flavored ice cream(s), flavored frozen yogurt(s), flavored sorbet(s), and/or flavored gelato(s) can be poured at the moment), a cleaning icon (indicating the Cleaning Process is still going on), with a timer (indicating the length of the Cleaning Process), will appear on the screen. The three icons will disappear, once the Cleaning Process is done, allowing the user to pour a selected flavored ice cream(s), flavored frozen yogurt(s), flavored sorbet(s), and/or flavored gelato(s) once again.

Operation—Vending

The machine according to the present invention can also feature connection, interaction with a Credit/Debit Card POS Terminal 5. Where the Touch-Screen Interface 4 is used to enable certain amounts of user selected flavored ice cream(s), flavored frozen yogurt(s), flavored sorbet(s), and/or flavored gelato(s), then can be made by the user using a credit or debit card, through the Credit/Debit Card POS Terminal 5. The operator can turn the vending function ON for the machine, change the different amounts of flavored ice-creams, flavored frozen yogurts, flavored sorbets, and/or flavored gelatos available to be dispensed, and the prices for said dispensing amounts through the Touch-Screen Interface 4 via. Settings—Vending. The edited dispensing and priced amount (Price Per Amount Indicator) will then display on the Pour Screen, and when a Flavor Button is held. Once the user has selected the flavored ice-cream(s), flavored frozen yogurt(s), flavored sorbet(s), and/or flavored gelato(s) to dispense, selects a Price Per Amount Button, pays for said amount, and starts pressing/holding the Pour Button, the Touch-Screen Interface 4 will open the corresponding valve 25A for the Storage Slot(s) 25 letting out the selected flavored ice-cream(s), flavored frozen yogurt(s), flavored sorbet(s), and/or flavored gelato(s) until the amount limit has reached.

Once the amount limit has been reached, the valve 25A for the Storage Slot(s) 25 will shut and the selected flavored ice-cream(s), flavored frozen yogurt(s), flavored sorbet(s), and/or flavored gelato(s) (if not poured out of the machine's final Dispensing Valve 6) will stay in the Final Pipe(s) 28 until the Touch-Screen Interface 4 is redirected to the Home Screen, which will trigger the Cleaning Process. The control system will let the Touch-Screen Interface 4 know when the bought amount of flavored ice-cream(s), flavored frozen yogurt(s), flavored sorbet(s), and/or flavored gelato(s) has been reached, stopping the chosen flavored ice-cream(s), flavored frozen yogurt(s), flavored sorbet(s), and/or flavored gelato(s) being dispensed into the Final Pipe(s) 28 (as soon as the price-per amount is paid for, the selected flavored ice-cream(s), flavored frozen yogurt(s), flavored sorbet(s), and/or flavored gelato(s) will keep dispensed into the Final Pipe(s) 28, even if the Pour Button is not being held, and will be available to pour, until the Touch-Screen Interface 4 is redirected to the Home Screen).

The Touch-Screen Interface 4 will automatically be redirected to the Home Screen, after there is no more of the paid for selected flavored ice-cream(s), flavored frozen yogurt(s), flavored sorbet(s), and/or flavored gelato(s) left in the Final Pipe(s) 28, or after 5 minutes of inactivity. When two or more selected flavored ice-cream(s), flavored frozen yogurt(s), flavored sorbet(s), and/or flavored gelato(s) are selected to dispense, they will dispense at the same time until the dispensing limit has reached.

How It Works—Operation (Cleaning Process)

All of the high-pressure water released throughout the machine, comes from the High-Pressure Water Hopper. The High-Pressure Water Hopper can either be manually filled up with buckets of water (by opening up the High-Pressure Water Hopper lid) or by connecting a water hose to the High-Pressure Water Hopper's Hose Connector. The user can then turn on the hose whenever he/she pleases to fill up the High-Pressure Water Hopper and turn it off when it has reached a sufficient amount. An alternative route can also be taken when a water pipe is connected to the Hose Connecter, where the control system will automatically open up the Hose Connecter inlet/outlet valves, when the high-pressure water level is at 15%, allowing the water from the pipe to flow into the High-Pressure Water Hopper (it will be filled up to a level of 100% and then the inlet/outlet valve will be closed again).

The hopper itself needs to be at least 15% full, in order for it to create pressurized water. This pressurized water is made at the bottom of the hopper where there is an electrically powered High-Pressure Water Pump, which makes high pressure water accumulate in the hopper until the valves for any of the High-Pressure Water Hose(s) or High-Pressure Water Pipe(s) are opened. Once it is opened, the high-pressure water will shoot out of any or all of the pipes or hoses until the valves are closed again. When the Cleaning Process commences (the cleaning of excess soft serve in the Final Pipe(s) 28), the control system will open the inlet valves for the High-Pressure Water Pipe(s). The control system is able to determine where the excess soft serve is, and which inlet valves for the High-Pressure Water Pipe(s), to open. This will result in the High-Pressure Water Hopper's high-pressure water to burst through the High-Pressure Water Pipe(s), and into the Final Pipe(s) 28, thus cleaning the Final Pipe(s) 28 of any excess flavored ice cream(s), flavored frozen yogurt(s), flavored gelato(s), and/or flavored sorbet(s).

Once the cleaning is done, the valves for the High-Pressure Water Pipe(s) will shut (stopping the dispensing of high-pressure water) and the valves for the Dirty Water Pipes will open. This will let the dirty water (created after cleaning the excess soft serve in the Final Pipe(s) 28) to exit the Final Pipe(s) 28, out through the Dirty Water Pipes, and into the Dirty Water Hopper (once all of the dirty water from the Final Pipe(s) 28 is in the Dirty Water Hopper, the Cleaning Process is complete). The time spent cleaning the Final Pipe(s) 28 after any particular flavored ice-cream(s), flavored frozen yogurt(s), flavored sorbet(s), and/or flavored gelato(s) is dispensed, can be adjusted through the Touch-Screen Interface 4, via. Settings—Cleaning Process (default settings will have the process lasting 15 seconds). All of the remaining valves that were opened during the process will shut, and the machine will be ready for normal operation. On each page or screen of the Touch-Screen Interface 4, a lock icon (indicating no flavor(s) can be poured at the moment), a cleaning icon (indicating the Cleaning Process is still going on), with a timer (indicating the length of the Cleaning Process), will appear on the screen. The three icons will disappear once the Cleaning Process is done. If a Washing Process of any kind is selected while a Cleaning Process is occurring, the Cleaning Process will end immediately and the valves opened during the Cleaning Process will close, and the Washing Process will commence.

How It Works—Operation (Washing Process for a Base)

If a user would like to clean a base(s) (depending on how many High-Pressure Water Hoses are installed in the particular version of the machine), the user would have to first attach a High-Pressure Water Hose, to the valve at the top of the Base Hopper 14. Then the user would have to access the Touch-Screen Interface 4 go to Settings—Base Levels, select the base that the High-Pressure Water Hose is connected to, and press the Wash Button. Once the Wash Button has been pressed for the specified base, the Touch-Screen Interface 4 will cause the valve located at the top of the selected High-Pressure Water Hose to open. (The interface will only open up the valve for the High-Pressure Water Hoses if they are connected to a valve on the base hopper).

Then the Touch-Screen Interface 4 will open up the valves located at the top of the selected base's Base Hopper 14 and all of the valves located at the top of the selected base's mixing chambers 19, Storage Slots 25, the connected Final Pipe 28, and (once the washing is done) the Dirty Water Pipes. When the Washing Process for a base commences, the high-pressure water in the High-Pressure Water Hopper will burst out of the hopper's opened valve, through the High-Pressure Water Hose, which will disburse the high-pressure water through the Base Hopper 14, into all of the connected mixing chambers 19, into all of the connected Storage Slots 28, and into the connected Final Pipe 28. This will continue until, every object the high-pressure water has passed through, Is clean (approximately 10 minutes).

Once the washing is done, the valves for the High-Pressure Water Hose will shut (letting no more high-pressure water to release into the machine) and the valves for the Dirty Water Pipes will open, letting the dirty water (from washing the base) to drip down to the Dirty Water Hopper. Once all of the dirty water is in the Dirty Water Hopper, the Washing Process will be over (approximately 5 minutes). All of the remaining valves that were opened during the process will shut, and the machine will be ready for normal operation (Cleaning Process of the Final Pipe(s) 28 may commence right after the Wash Button is deselected automatically or manually, if there is any excess liquid in the Final Pipe(s) 28).

Once the Washing Process has begun, no flavored soft serve can be dispensed/poured, until the Washing Process is over. Depending on the amount of High-Pressure Water Hoses are installed in the version of the machine, two or even all of the base hoppers can be cleaned simultaneously. Once the Washing Process is finished, the Wash Button will be deselected and the machine will be able to function normally again (the Wash Button can be manually deselected, to stop the Washing Process at any time). On each page or screen of the Touch-Screen Interface 4, a lock icon (indicating no flavor(s) can be poured at the moment), a washing icon (indicating the Washing Process is still going on), with a timer (indicating the length of the Washing Process), will appear on the screen. The three icons will disappear once the Washing Process is done.

How It Works—Operation (Washing Process for a Flavor)

If a user would like to clean a flavored ice-cream(s), flavored frozen yogurt(s), flavored sorbet(s), and/or flavored gelato(s) (depending on how many High-Pressure Water Hoses are installed in the particular version of the machine), the user would have to first attach a High-Pressure Water Hose, to the valve on top of the flavored ice-cream's, flavored frozen yogurt's, flavored sorbet's, or flavored gelato's corresponding mixing chamber 19, after removing the corresponding Flavour Cartridge. Then the user would have to access the Touch-Screen Interface 4 go to Settings—Flavor Levels, select the flavored ice-cream, flavored frozen yogurt, flavored sorbet, or flavored gelato that the High-Pressure Water Hose is connected to, and press the Wash Button. Once the Wash Button has been pressed for the selected flavored ice-cream, flavored frozen yogurt, flavored sorbet, or flavored gelato, the Touch-Screen Interface 4 instruct the control system to open up the valve located at the top of the selected High-Pressure Water Hose. (The interface will only open up the valve for the High-Pressure Water Hoses if they are connected to a valve).

The Touch-Screen Interface 4 will also instruct the opening up of the following valves (for the specified flavored ice-cream, flavored frozen yogurt, flavored sorbet, or flavored gelato): on top of the mixing chamber 19, on top of the Storage Slot 25, on top of the connected Final Pipe 28, and (after the washing is over) the Dirty Water Pipes. When the Washing Process for a flavor commences, the high-pressure water in the High-Pressure Water Hopper will burst out of the hopper's opened valve, through the High-Pressure Water Hose, into the selected flavor's mixing chamber 19, into the selected flavor's Storage Slot 25, and into the connected Final Pipe 28. This will continue until, every object the high-pressure water has passed through, Is clean (approximately 4 minutes).

Once the washing is done, the valves for the High-Pressure Water Hose will shut (letting no more high-pressure water to release into the machine) and the valves for the Dirty Water Pipes will open, letting the dirty water (from washing the flavor) to drip down to the Dirty Water Hopper. Once all of the dirty water is in the Dirty Water Hopper, the Washing Process will be over (approximately 3 minutes). All of the remaining valves that were opened during the process will shut (Cleaning Process of the Final Pipe(s) 28 may commence right after the Wash Button is deselected automatically or manually, if there is any excess liquid in the Final Pipe(s) 28).

Once the Washing Process has begun, no flavored soft serve can be dispensed/poured, until the Washing Process is over. Depending on the amount of High-Pressure Water Hoses are installed in the version of the machine, two or more flavors can be cleaned simultaneously. Once the Washing Process is finished, the Wash Button will be deselected and the machine will be able to function normally again (the Wash Button can be manually deselected, to stop the Washing Process at any time). On each page or screen of the Touch-Screen Interface 4, a lock icon (indicating no flavor (s) can be poured at the moment), a washing icon (indicating the Washing Process is still going on), with a timer (indicating the length of the Washing Process), will appear on the screen. The three icons will disappear once the Washing Process is done.

How It Works—Operation (Washing Process for High-Pressure Water)

The user would rarely ever have a need to wash the High-Pressure Water Hopper, but if so it can be done. First, the user would check the High-Pressure Water Levels through the Touch-Screen Interface 4 via. Settings—Water levels—High-Pressure Water Levels, [no flavored ice-cream(s), flavored frozen yogurt(s), flavored sorbet(s), and/ or flavored gelato(s) will be able to pour, and no Cleaning Process or Washing Process (for bases, flavors, and dirty water) will be able to launch during the washing of high-pressure water]. Ultimately, the High-Pressure Water Hopper will only be drained through this process, not cleaned (the cleaning of the hopper would have to be done manually). In order to drain the hopper, the user will first need to reach the High-Pressure Water Level Page and press the Wash Button.

Once the Wash Button has been pressed, the valves for the High-Pressure Water Pipe(s) and both of the Dirty Water Pipes will be opened (and will shut again once the Wash Button has been deselected). They will release the high-pressure water from the hopper, through the High-Pressure Water Pipes, into the Final Pipe(s) 28, through the Dirty Water Pipes, and into the Dirty Water Hopper. This results in the drainage of the High-Pressure Water Hopper's contents (this will continue until the High-Pressure Water Hopper is empty, or until the user deselects the Wash Button, on the High-Pressure Water Level Page). Once, the process is over, all of the opened valves will be shut/closed again and the machine will be ready for regular function (unless the hopper is completely empty, it would need to be filled up). On every screen or page of the Touch-Screen Interface 4, a lock icon (indicating no flavor(s) can be poured at the moment), a washing icon (indicating the Washing Process is still going on), with a timer (indicating the length of the Washing Process), will appear. The three icons will disappear once the Washing Process is done.

Also, the user can stop the Washing Process for high-pressure water at any time by simply deselecting the wash button (on the High-Pressure Water Levels Page). This will cause the valves for the High-Pressure Water Pipe(s) to close again. The Valves for the Dirty Water Pipes will close, after all of the excess water in the Final Pipe(s) 28 (after being sprayed into it by the High-Pressure Water Pipe(s)) is drained into the Dirty Water Hopper. Once that has been achieved, the Dirty Water Pipes' valves will close, and the machine will be ready for regular use. When the Washing Process is going on, no other function (dispensing of flavored ice-cream, flavored frozen yogurt, flavored sorbet, or flavored gelato, Washing or Cleaning Process) of the machine can be done.

How It Works—Operation (Washing Process for Dirty Water)

The user can check the Dirty Water Levels through the Touch-Screen Interface 4 via. Settings—Water Levels—Dirty Water Levels, and if the level is at 100% full; no flavor will be able to pour, and no Cleaning Process or Washing Process (for bases & flavors) will be able to launch. Ultimately, the Dirty Water Hopper will have to be drained to at least 80% full for regular function of the machine to continue on (the ideal solution would be draining the hopper to 0%). In order to drain the Dirty Water Hopper, the user will first need to reach the Dirty Water Levels page, then press the Wash Button, (make sure a hose leading to a drain is attached to the Dirty Water Hopper's bottom dispensing valve, before pressing the Wash Button).

Once the Wash Button has been pressed, the Dirty Water Hopper's Dispensing valve will open (and will shut again once the Wash Button has been deselected), resulting in the Dirty Water Hopper's contents to drain. As that is happening, the valves for the High-Pressure Water Pipe(s), and Dirty Water Pipes will be opened. The high-pressure water will release through the High-Pressure Water Pipe(s), into the Final Pipe(s), through the Dirty Water Pipes and into the Dirty Water Hopper, cleaning them as they are being drained (this will continue for approximately 10 minutes and then the final drainage of water will start). Once the washing has been done, the valves for the High-Pressure Water Pipes, and Dirty Water Pipes will close again and the final drainage will begin. The final drainage will end once the Dirty Water Hopper's dispensing valve empties out all of the hopper's inner contents. The dispensing valve for the Dirty Water Hopper will close again once the hopper is drained to 0%/or when the Wash Button is deselected. Once the hopper is at 0% the Wash Button will deselect, and the machine will be ready for regular function (this will take approximately 5 minutes). On every screen or page of the Touch-Screen Interface 4, a lock icon (indicating no flavor(s) can be poured at the moment), a washing icon (indicating the Washing Process is still going on), with a timer (indicating the length of the Washing Process), will appear. The three icons will disappear once the Washing Process is done.

Also, the user can stop the Washing Process for dirty water at any time by simply deselecting the Wash Button (on the Dirty Water Levels Page). This will cause the valves for the High-Pressure Water Pipe(s) and Dirty Water Hopper to close again. The valves for the Dirty Water Pipes will close, after all of the excess water in the Final Pipe(s) 28 (after being sprayed into it by the High-Pressure Water Pipe(s)) is drained into the Dirty Water Hopper. Once that has been achieved, the Dirty Water Pipes' valves will close and the machine will be ready for regular use. When the Washing Process is going on, no other function (dispensing of flavored ice-cream, flavored frozen yogurt, flavored sorbet, or flavored gelato, Washing or Cleaning Process) of the machine can be done.

Turning the Machine ON/OFF

To turn the machine ON/OFF, a user can press the physical power button along the Touch-Screen Interface's 4 exterior to ON/OFF, which will either give the machine full power or no power (respectively). To turn the machine OFF the user can also unplug the machine's Power Cord from the connected outlet, and in order to turn the machine ON by pressing the physical button along the screen's exterior, the machine's Power Cord needs to be plugged into an outlet. The user can also put the machine on Standby Mode via. Settings—Power—Standby, which is ideal for after hours. If the machine is turned OFF in any way, the Touch-Screen Interface's 4 Settings will stay normal, they only change to default manually.

While the principles of the invention have been shown and described in connection with specific embodiments, it is to be understood that such embodiments are by way of example and are not limiting as is evident from the foregoing description, certain aspects of the present invention are not limited by the particular details illustrated in the drawings. Other modifications and applications, or equivalents, will occur to those skilled in the art. The terms "having", "comprising" and "including" and similar terms as used in the foregoing specification are used in the sense of "optional" or "may include" and not as "required". Many changes, modifications, variations and other uses and applications of the present construction will, however, become apparent to those skilled in the art after considering the specification and attached drawings. All such changes, modifications, variations and other uses and applications which do not depart from the spirit and scope of the invention are deemed to be covered by the invention which is limited only by the claims that follow. The scope of the disclosure is not intended to be limited to the embodiments shown herein, but is to be accorded the full scope consistent with the claims, wherein reference to an element in the singular is not intended to mean "one and only one" unless specifically so stated, but rather one or more. All structural and functional equivalents to the elements of the embodiment described throughout the disclosure that are known or later come to be known to those of ordinary skill in the art are expressly incorporated herein by reference and intended to be encompassed by the claims.

The embodiments of the invention in which an exclusive property or privilege is claimed are defined as follows:

1. A frozen soft-serve confection dispensing machine where the soft serve confection is a flavored frozen soft-serve confection having a base selected from ice creams, frozen yogurts, sorbets and gelatos, the dispensing machine comprising one or more base hoppers, one or more dedicated detachable base cartridges, a plurality of detachable flavour cartridges containing a flavour mix and a plurality of dedicated mixing chambers, wherein each base hopper has one or more inputs linked to an output of one of said one or more dedicated detachable base cartridges, and each flavour cartridge having an output linked to an input of one of the plurality of dedicated mixing chambers said dedicated mixing chamber having a second input linked to an output of one of the one or more base hoppers, wherein each of the plurality of dedicated mixing chambers having a dedicated storage slot and control means to enable selection of a flavour mix from one of the dedicated flavour cartridges, and a base in one of the base hoppers, and wherein the selected flavour mix to feed from one of the dedicated flavour cartridges and base in one of the base hoppers to feed into and be mixed one of the plurality of dedicated mixing chambers linked to the dedicated flavour cartridge and then storing and refrigerating the mixture of the base and flavour mix in dedicated storage slot associated with the dedicated mixing chamber to form the mixed frozen soft-serve confection for dispensing.

2. A frozen soft-serve confection dispensing machine according to claim 1, wherein the control means includes a touch-screen interface through which a user can select a base from the group consisting of ice creams, frozen yogurts, sorbets and gelatos and one or more flavour mixes to be mixed with the selected base.

3. A frozen soft-serve confection dispensing machine according to claim 2 wherein the control means includes level detecting means to detect the levels of ice-cream bases, frozen yogurt bases, gelato bases, and/or sorbet bases, flavored ice-creams, flavored frozen yogurts, flavored gelatos, and/or flavored sorbets in each base hopper and the flavored mixes in the, flavour cartridges.

4. A frozen soft-serve confection dispensing machine according to claim 3, wherein the control means is capable of being programmed into automatically controlling the feed of flavour mix from one of the dedicated flavour cartridges and base from one of the base hoppers into one of the plurality of dedicated mixing chambers in the machine.

5. A frozen soft-serve confection dispensing machine according to claim 4, wherein the touch-screen interface presents numerous touchable buttons on a touch-screen interface display via different pages and screens, that can be used to control all different aspects or functions of the machine.

6. A frozen soft-serve confection dispensing machine according to claim 5, wherein after a user has selected a flavored ice-cream(s), flavored frozen yogurt(s), flavored gelato(s), and/or flavored sorbet(s) to be dispensed on the touch-screen interface, the control system causes the user's selected flavored ice-cream(s), flavored frozen yogurt(s), flavored gelato(s), and/or flavored sorbet(s), to be dispensed.

7. A frozen soft-serve confection dispensing machine according to claim 6 wherein a refrigeration unit is provided to control the temperature in the mixing chambers and storage slots and a built-in electric churner is provided in each flavour storage slot which churns the mixture inside the flavor storage slot for fifteen seconds every 10 minutes, and to form and maintain a soft serve confection.

8. A frozen soft-serve confection dispensing machine according to claim 7 wherein high-pressure water is used to clean and wash any excess soft serve confection in the final dispensing pipes, after the operator goes back to the home screen on the touch-screen interface.

9. A frozen soft-serve confection dispensing machine according to claim 8 having means to wash any hoppers of the machine carrying ice-cream bases, frozen yogurt bases, gelato bases, and/or sorbet bases, and any storage slots carrying flavored ice-creams, flavored frozen yogurts, flavored gelatos, or flavored sorbets in the machine, through connection of one of the machine's multiple high-pressure water hoses to the specified hopper or mixing unit above the specified flavor storage slot, and selecting the specified flavored ice-cream storage slot, flavored frozen yogurt storage slot, flavored gelato storage slot, flavored sorbet storage slot, ice-cream base, frozen yogurt base, gelato base, or sorbet base to be cleaned, by pressing a button on the touch-screen interface.

10. A frozen soft-serve confection dispensing machine according to claim 1 having a debit/credit card POS terminal.

* * * * *